United States Patent
Zhu et al.

(10) Patent No.: US 7,602,907 B2
(45) Date of Patent: Oct. 13, 2009

(54) ELLIPTIC CURVE POINT MULTIPLICATION

(75) Inventors: Bin Zhu, Edina, MN (US); Min Feng, Chengdu (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 854 days.

(21) Appl. No.: 11/173,251

(22) Filed: Jul. 1, 2005

(65) Prior Publication Data

US 2007/0064931 A1 Mar. 22, 2007

(51) Int. Cl.
*H04K 1/00* (2006.01)
*H04K 3/00* (2006.01)

(52) U.S. Cl. .............................. 380/30; 380/1; 708/204; 708/624

(58) Field of Classification Search ...................... 380/1, 380/30; 708/204, 442, 491, 620, 624–628
See application file for complete search history.

(56) References Cited

U.S. PATENT DOCUMENTS 6,252,959 B1 * 6/2001 Paar et al. ...................... 380/28
6,298,135 B1 * 10/2001 Messerges et al. .............. 380/1
6,430,588 B1   8/2002 Kobayashi et al.

OTHER PUBLICATIONS

Hedabou, Mustapha et al., "A Comb Method to Render ECC Resistant against Side Channel Attacks," 2004, INSA de Toulouse.*
"Practical C++," 1999, Que Corporation.*
Wikipedia, "Ternary," as obtained by www.archive.org, Jul. 28, 2004.*
Hedabou, Mustapha et al. "Countermeasures for Preventing Comb Method Against SCA Attacks," Mar. 31, 2005, Springer-Verlag Berlin Heidelberg, Lecture notes in Computer Science, pp. 85-96.*
PCT Search Report for Patent Application No. PCT/US06/25498, Mailed on Jan. 29, 2008, 10 pgs.

* cited by examiner

*Primary Examiner*—Kimyen Vu
*Assistant Examiner*—Darren Schwartz
(74) *Attorney, Agent, or Firm*—Lee & Hayes, PLLC

(57) ABSTRACT

Systems and methods configured for recoding an odd integer and elliptic curve point multiplication are disclosed, having general utility and also specific application to elliptic curve point multiplication and cryptosystems. In one implementation, the recoding is performed by converting an odd integer k into a binary representation. The binary representation could be, for example, coefficients for powers of two representing the odd integer. The binary representation is then configured as comb bit-columns, wherein every bit-column is a signed odd integer. Another implementation applies this recoding method and discloses a variation of comb methods that computes elliptic curve point multiplication more efficiently and with less saved points than known comb methods. The disclosed point multiplication methods are then modified to be Simple Power Analysis (SPA)-resistant.

12 Claims, 15 Drawing Sheets

1300

1302
CONVERT AN ODD INTEGER $k$ INTO A BINARY REPRESENTATION

1304
CONVERT EACH BIT OF A LEAST SIGNIFICANT $d$ BITS OF THE BINARY REPRESENTATION OF THE ODD INTEGER $k$ CONSISTENT WITH A LEAST SIGNIFICANT BIT IN EACH BIT COLUMN THAT IS EITHER 1 OR $\bar{1}$

1306
CONVERT BITS OF THE BINARY REPRESENTATION HAVING SIGNIFICANCE GREATER THAN $d$ SUCH THAT A RESULTING BIT AT AN $i$-th POSITION IS EITHER A 0 OR A SIGNED 1, WHEREIN THE SIGNED 1 IS SIGNED ACCORDING TO A BIT AT AN $(i \bmod d)^{\text{th}}$ POSITION

1308
COMPARE A SIGN OF A CURRENT BIT TO A SIGN OF A LEAST SIGNIFICANT BIT IN A SAME COMB BIT-COLUMN; AND
WHERE THE SIGNS ARE DIFFERENT AND THE CURRENT BIT IS 1, SET THE CURRENT BIT TO $\bar{1}$ AND INCREMENT BY 1 A VALUE OF A NEXT HIGHER SIGNIFICANT BIT TO MAINTAIN $k$'s VALUE

1310
CONFIGURE THE BINARY REPRESENTATION AS COMB BIT-COLUMNS, WHEREIN EVERY BIT COLUMN IS A SIGNED ODD NUMBER

ELLIPTIC CURVE POINT MULTIPLICATION

BACKGROUND

Elliptic Curve Cryptosystems (ECCs) constitute a new emerging class of public key cryptosystems, and have been widely applied in applications such as smart cards and embedded systems. The security of most ECCs is based upon the difficulty of solving a discrete logarithm problem based on a group of points on the elliptic curve. Where the elliptic curve is chosen correctly, the best of known methods configured for finding the discrete logarithm are of exponentially increasing difficulty. Thus, ECC exploits the fact that there is no sub-exponential method to solve the discrete logarithm problem on elliptic curves. Compared with other public key cryptosystem such as RSA, ECC uses shorter key sizes for the same level of security. This translates into fewer requirements on storage, memory, and computing power.

Unfortunately, conventional methods of operation in ECC are vulnerable to side-channel attacks. Side channel attacks measure observable parameters such as timings or power consumptions during cryptographic operations to deduce all or part of the secret information within the cryptosystem. For example, the comb method and other efficient point multiplication methods are vulnerable to power-analysis attacks. Power analysis attacks are based on an analysis of power consumed by a system. Information on the power used by a system assists the attacker to make assumptions on the operations performed by the system, and ultimately, to make guesses about secrets contained within the system.

Scalar multiplication, e.g. elliptic curve point multiplication, plays a critical role in ECCs. In fact, the method by which such multiplications are performed has a tremendous influence on whether different side-channel attacks are effective. Therefore, improved methods would result in safer ECCs.

SUMMARY

Systems and methods configured for recoding an odd integer and for elliptic curve point multiplication are disclosed, having general utility and also specific application to elliptic curve point multiplication and cryptosystems. In one implementation, the recoding is performed by converting an odd integer k into a binary representation. The binary representation could be, for example, coefficients for powers of two representing the odd integer. The binary representation is then configured as comb bit-columns, wherein every bit-column is a signed odd integer. Another implementation applies this recoding method and discloses a variation of comb methods that computes elliptic curve point multiplication more efficiently and with less saved points than known comb methods. The disclosed point multiplication methods are then modified to be Simple Power Analysis (SPA)-resistant.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 13 illustrates an example embodiment of recoding, which has general utility or could be utilized for comb elliptic curve point multiplication or within a cryptosystem.

DETAILED DESCRIPTION

Overview

Figure 1:
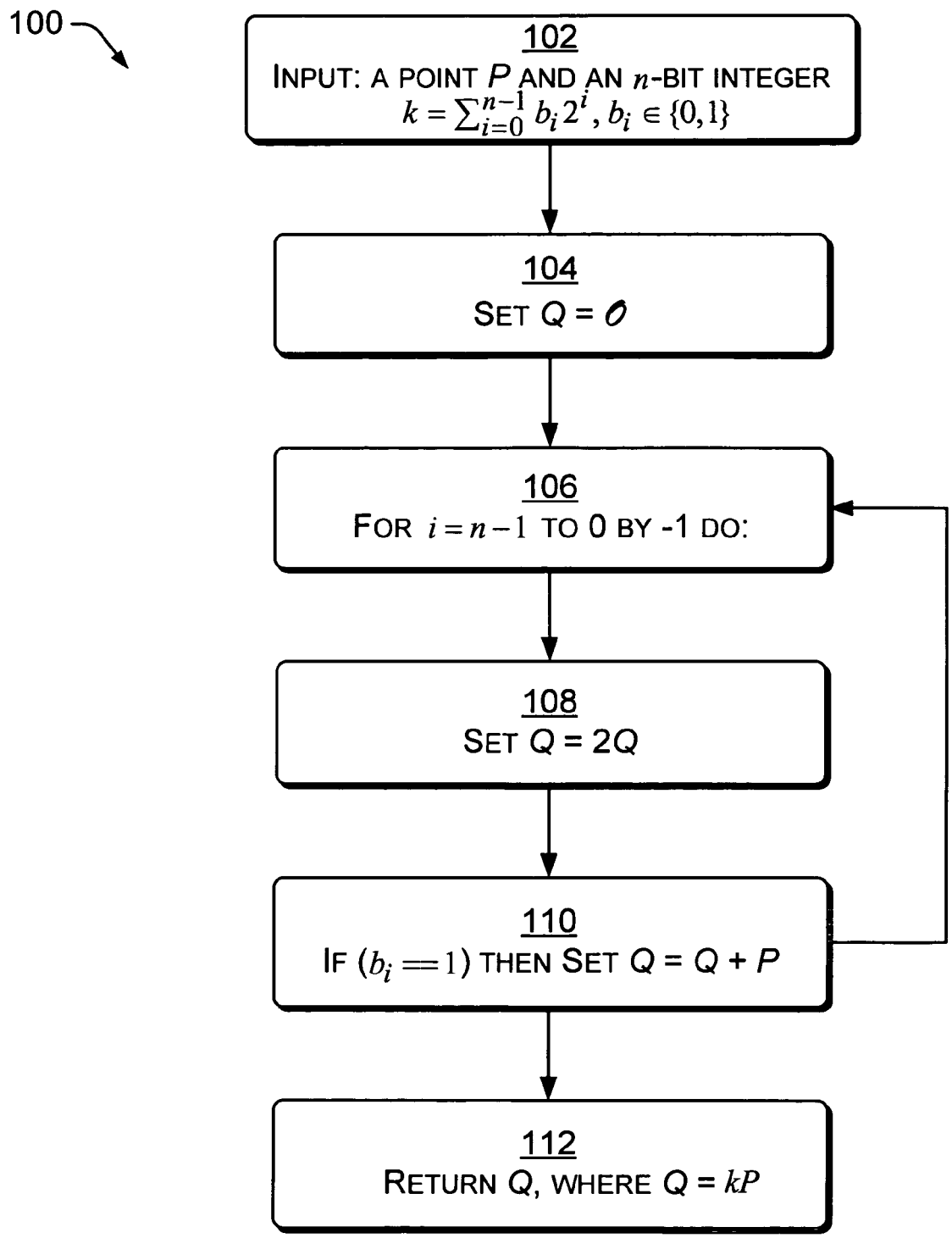
FIGS. 1-4 illustrate exemplary existing elliptic curve point multiplication methods.

Recoding an odd integer and elliptic curve point multiplication, having general utility and specific application to elliptic curve cryptosystems, are disclosed. In one implementation, a signed odd-only recoding method is presented that converts an odd scalar into a signed, nonzero representation wherein every comb bit-column $\mathbb{K}_j$ is a signed odd integer. Another implementation applies this recoding method and discloses a variation of comb methods that computes elliptic curve point multiplication more efficiently and with less saved points than known comb methods. The disclosed point multiplication methods are then modified to be Simple Power Analysis (SPA)-resistant by exploiting the fact that point addition and point subtraction are virtually of the same computational complexity in elliptic curves systems. The disclosed SPA-resistant comb methods are configured to inherit a comb method's advantage—running much faster than other SPA-resistant window methods when pre-computation points are calculated in advance or elsewhere. Combined with the techniques that convert a SPA-resistant method into a DPA-resistant method, the disclosed SPA-resistant comb embodiments are secure to all side-channel attacks. Accordingly, implementations disclosed herein are of use generally, and are particularly adapted for use in smart card and embedded applications wherein power and computing resources are at a premium.

Preliminaries

Elliptic curve equations are a central feature of Elliptic Curve Cryptosystems (ECCs). An elliptic curve over a field K can be expressed by its Weierstrass form:

$$E: y^2 + a_1 xy + a_3 y = x^3 + a_2 x^2 + a_4 x + a_6, \text{ where } a_i \in F.$$

We denote by E(F) the set of points $(x, y) \in F^2$ satisfying the above equation plus the "point at infinity" $\mathcal{O}$. With the chord-tangent process, E(F) forms an Ablelian group with the point at infinity $\mathcal{O}$ as the zero. Let $P_1(x_1, y_1)$ and $P_2(x_2, y_2)$ be two finite points on E. The point addition $P_3(x_3, y_3) = P_1 + P_2$ is computed as follows:

1. If $x_1 = x_2 = x$ and $y_1 + y_2 = -(a_1 x + a_3)$, then $P_3 = \mathcal{O}$.
2. If $P_1 = P_2 = (x, y)$ and $2y \neq -(a_1 x + a_3)$, then $$\begin{cases} x_3 = \left(\dfrac{3x^2 + 2a_2x + a_4 - a_1y}{2y + a_1x + a_3}\right)^2 + a_1\left(\dfrac{3x^2 + 2a_2x + a_4 - a_1y}{2y + a_1x + a_3}\right) - a_2 - 2x \\ y_3 = \dfrac{3x^2 + 2a_2x + a_4 - a_1y}{2y + a_1x + a_3}(x - x_3) - y - (a_1x_3 + a_3) \end{cases}$$

3. If $P_1 \neq \pm P_2$, then $$\begin{cases} x_3 = \left(\dfrac{y_2 - y_1}{x_2 - x_1}\right)^2 + a_1\left(\dfrac{y_2 - y_1}{x_2 - x_1}\right) - a_2 - x_1 - x_2 \\ y_3 = \dfrac{y_2 - y_1}{x_2 - x_1}(x_1 - x_3) - y_1 - (a_1x_3 + a_3) \end{cases}$$

The group E(F) generated by an elliptic curve over some finite field F meets the public key cryptography requirements that the discrete logarithm problem is very difficult to solve. Therefore, ECCs have been used in many standards and applications. In order to speed up cryptographic operations, projective coordinates are used to represent elliptic curve points. By using the Jacobian projective coordinates, the Weierstrass equation can be written in the form:

$$E: Y^2 + a_1XYZ + a_3YZ^3 = X^3 + a_2X^2Z^2 + a_4XZ^4 + a_6Z^6.$$

The point at infinity $O$ is then represented by $(\theta^2, \theta^3, 0)$ for all $\theta \in F^*$. An affine point $(x, y)$ is represented by $(\theta^2x, \theta^3y, \theta)$ for all $\theta \in F^*$ and a projective point $(X, Y, Z) \neq O$ corresponds to an affine point $(X/Z^2, Y/Z^3)$. Using projective coordinates, point addition can be calculated without costly field inversions at the cost of more field multiplications. A field multiplication is usually much faster than a field inversion, resulting in faster elliptic curve point addition. A special point addition wherein a point is added to itself is called doubling. The cost of point doubling is usually different from the cost of general point addition.

Elliptic curves used in cryptography are elliptic curves defined over fields $F_{2^m}$ or fields $F_p$ where m is a large integer and p is a big prime. Over these two kinds of fields, Weierstrass equations of elliptic curves can be reduced to the following simpler form:

$$E: y^2 + xy = x^3 + ax^2 + b$$

defined over $F_{2^m}$, or $$E: y^2 = x^3 + ax + b$$

defined over $F_p$, where p is a large prime. These equations simplify point addition and doubling, and may be referred to as the "short Weierstrass form". In practical cryptographic applications, elliptic curves are usually required to have a subgroup of a large prime-order $\rho$. An elliptic curve cryptosystem typically employs only points in this $\rho$-order subgroup of E(F).

Adding a point P to itself k times is called scalar multiplication or point multiplication, and is denoted as Q=kP, where k is a positive integer. The simplest efficient method for scalar multiplication is the following double-and-add method that expands k into a binary representation.

FIG. 1 shows an exemplary double-and-add method 100 of scalar multiplication adaptable to an ECC context. At block 102, input to the double-and-add method 100 is a point P and an n-bit integer $$k = \sum_{i=0}^{n-1} b_i 2^i$$

with $b_i \in \{0,1\}$. At block 104, the point Q is set initially to the point at infinity, i.e. we set $Q = O$. At block 106, a loop is entered, such as a for-loop with index i. The loop counts down from i=n−1 to 0 by −1. Within the loop: at block 108 set Q=2Q; and at block 110, if ($b_i$=1) then Q=Q+P. At block 112, the exemplary double-and-add method 100 of scalar multiplication returns Q, in the form Q=kP.

An integer k can be represented in a (binary) Signed Digit (SD) representation $$k = \sum_{i=0}^{n-1} s_i 2^i,$$

where $s_i \in \{-1, 0, 1\}$. A special SD representation called Non-Adjacent Form (NAF) is of particular interest, where there are no adjacent non-zero digits, i.e. $s_i \times s_{i+1} = 0$ for all $i \geq 0$. Every integer k has a unique NAF, and the NAF has the lowest weight among all SD representations of k. The expected weight of an NAF of length n bits is n/3, as compared with the expected weight of n/2 for the binary representation. Elliptic curve point subtraction has virtually the same cost as point addition. Therefore, the add-and-subtract method 200 of FIG. 2, using NAF for k, is more efficient than the double-and-add method 100.

Figure 2:
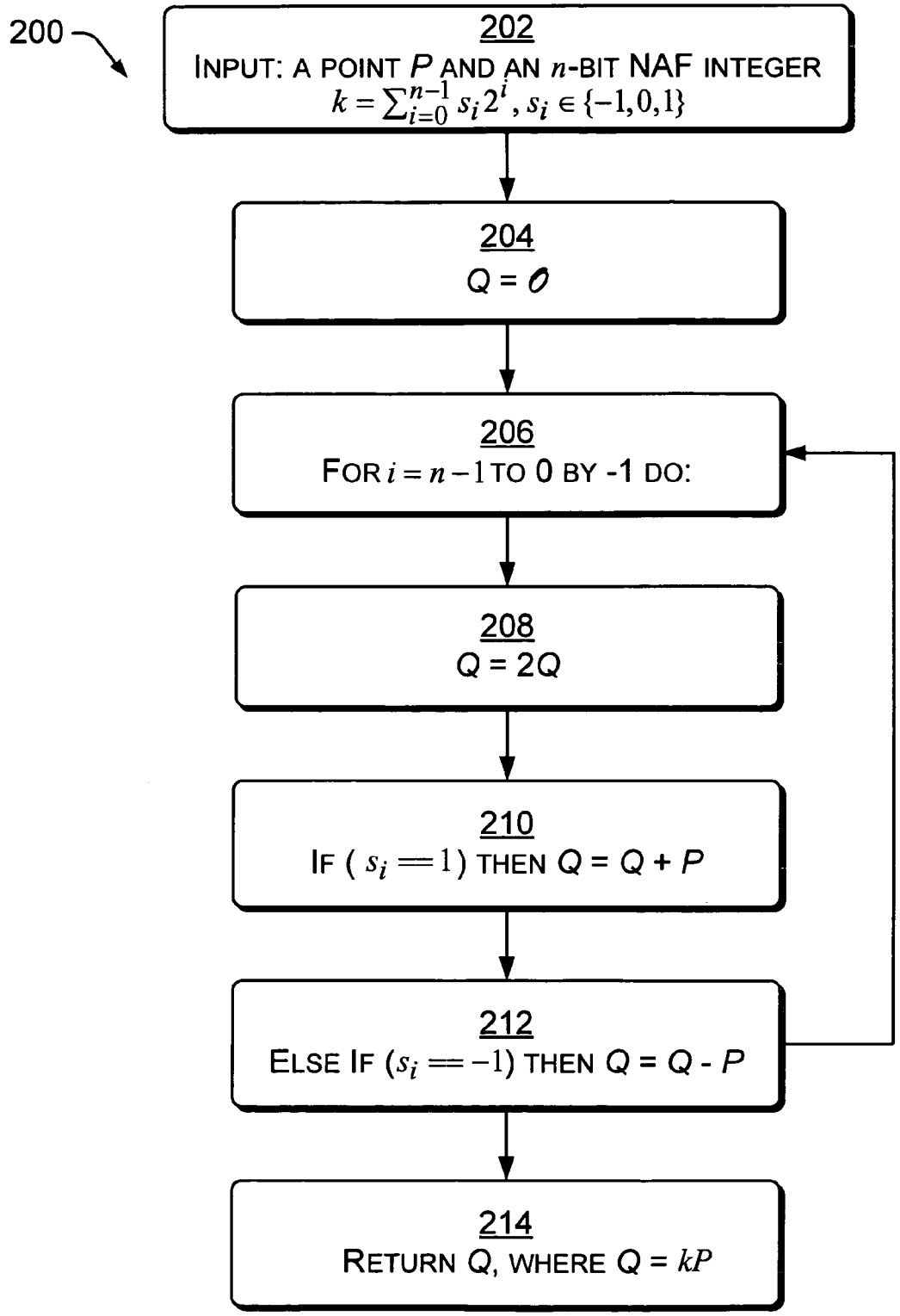

FIG. 2 shows an add-and-subtract method 200 for scalar multiplication (i.e. point multiplication). At block 202, input to the add-and-subtract method 200 includes a point P and an n-bit NAF integer $$k = \sum_{i=0}^{n-1} s_i 2^i,$$

$s_i \in \{-1, 0, 1\}$. At block 204, the point Q is set initially at the point at infinity, i.e. set $Q = O$. At block 206, a loop is entered, such as a for-loop with index i. The loop counts down from i=n−1 to 0 by −1. Within the loop: at block 208, set Q=2Q; at block 210, if ($s_i$==1) then Q=Q+P; and at block 212, if ($s_i$==−1) then Q=Q−P. At block 214, return output Q, wherein Q=kP.

An integer k can be expanded into m-ary representation, where m is usually equal to $2^w$ for some integer $w \geq 2$. The m-ary method 300 of FIG. 3 splits scalar multiplication into pre-computation and evaluation stages to trade storage for speed. The double-and-add method 300 is a special case of this method where w=1.

Figure 3:
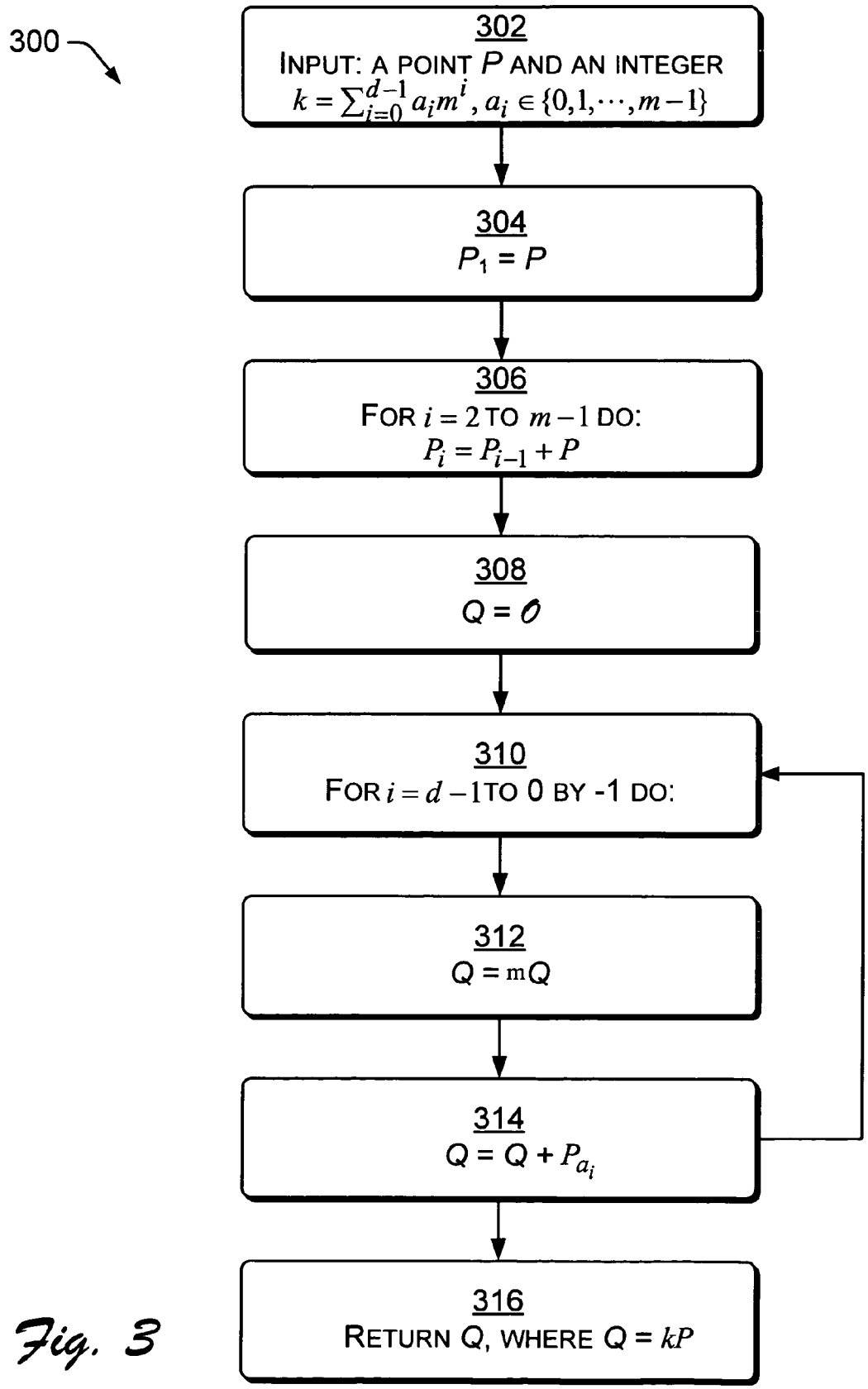

FIG. 3 shows an m-ary method 300 for scalar multiplication. At block 302, input to the m-ary method 300 includes a point P and an integer $$k = \sum_{i=0}^{d-1} a_i m^i,$$

$a_i \in \{0, 1, \ldots, m-1\}$. Blocks 304-308 represent the pre-computation stage. At block 304, set point $P_1 = P$. At block 306, a one-step loop is entered, such as a for-loop with index i. The loop counts from i=2 to m–i. Within the one-step loop: at block 306, set $P_i=P_{i-1}+P$. At block 308, the point Q is set initially at the point at infinity, i.e. set Q=$\mathcal{O}$. Blocks 310-314 represent an evaluation stage. At block 310, a loop is entered, such as a for-loop with index i. The loop counts down from i=d–1 to 0 by –1. Within the loop: at block 312, set Q=mQ, which requires w doublings; and at block 314, set Q=Q+$P_{a_i}$. At block, 316, return Q, wherein Q=kP.

The pre-computation stage in the m-ary method needs to store m–1≡$2^w$–1 points, including the storage for the input point P. A storage estimation in this disclosure is made with the input of a point P. An estimate of the time cost for the method may be made. In the cost estimation, operations involving $\mathcal{O}$ are not counted. The pre-computation stage needs to calculate 2P, 3P, . . . , [$2^w$–1]P. Since the sum of doublings and additions remains the same, and since doubling is more efficient than addition with the projective coordinates that are typically used in applications, use of doubling operations is generally preferred at this stage. An efficient scheme is to calculate in the following way:

$$\begin{cases} P_{2i} &= 2P_i, \\ P_{2i+1} &= P_{2i} + P. \end{cases} \quad (1)$$

Using this scheme, the pre-computation costs ($2^{w-1}$–1)D+($2^{w-1}$–1)A, where D means point doubling and A means point addition. As for the time cost for the evaluation stage, if an assumption is made that the most significant digit is not zero, i.e., $a_{d-1}\neq 0$, then the number of doublings in this stage is w(d–1). If $a_i=0$, then the addition in block 314 is not needed. If an assumption is made that k is uniformly distributed, then the average number of additions in the evaluation stage is $$\frac{2^w-1}{2^w}(d-1).$$

Therefore, the average time cost in the evaluation stage is approximately $$\{w(d-1)\}D + \left\{\frac{2^w-1}{2^w}(d-1)\right\}A,$$

and the average total time cost is approximately $$\{2^{w-1}-1+w(d-1)\}D + \left\{2^{w-1}-1+\frac{2^w-1}{2^w}(d-1)\right\}A.$$

Modification of m-ary methods can make them more efficient. For example, m-ary methods can also be extended to the sliding window methods. Comb methods are a further category of point multiplication methods. A comb method that can also efficiently calculate scalar multiplication is known. Let an n-bit integer $$k = \sum_{i=0}^{n-1} b_i 2^i$$

with $b_i \in \{0,1\}$. For an integer w≧2, set $$d = \lceil \frac{n}{w} \rceil.$$

Then define: [$b_{w-1}$, $b_{w-2}$, . . . , $b_1$, $b_0$]≡$b_{w-1}2^{(w-1)d}$+ . . . +$b_1 2^d$+$b_0$, where ($b_{w-1}$, $b_{w-2}$, . . . $b_1$, $b_0$)∈$Z_2^w$. In a manner that is consistent with these calculations, the comb method 400 of FIG. 4 uses a binary matrix of w rows and d columns to represent an integer k, and processes the matrix column-wise.

Figure 4:
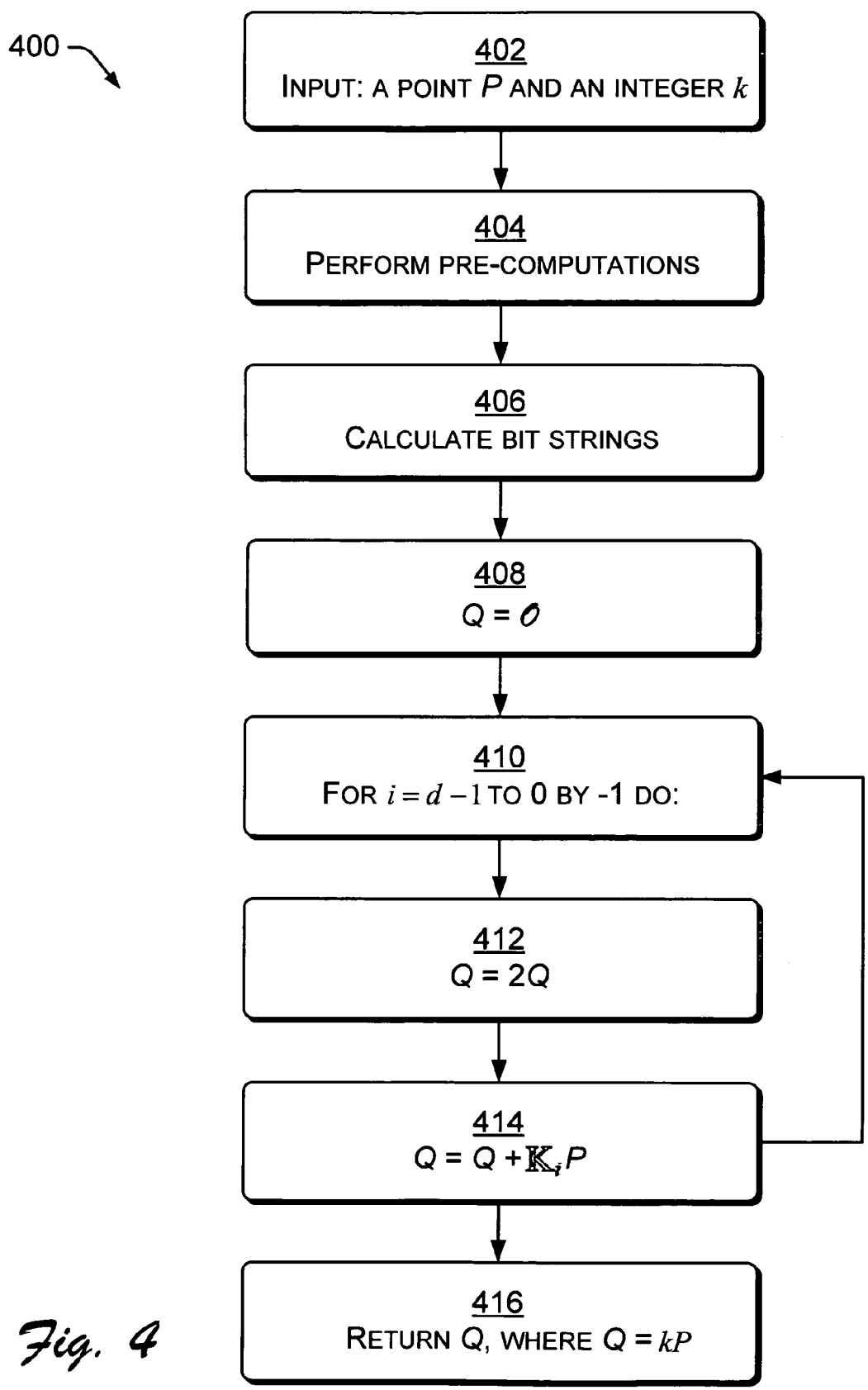

FIG. 4 shows a fixed-base comb method 400 for scalar multiplication. At block 402, input to the fixed-base comb method 400 includes a point P, an integer $$k = \sum_{i=0}^{n-1} b_i 2^i,$$

$b_i \in \{0,1\}$, and a window width w≧2. A pre-computational stage is seen in blocks 404-408. At block 404, [$b_{w-1}$, . . . $b_1$, $b_0$]P are computed for all ($b_{w-1}$, $b_{w-2}$, . . . $b_1$, $b_0$)∈$Z_2^w$. At block 406, determine k=$K^{w-1}$∥ . . . ∥$K^1$∥$K^0$, where each $K^j$ is a bit-string of length d. It may be necessary to pad with one or more 0 (zero) on the left in this operation. Let $K_i^j$ denote the i-th bit of $K^j$. Define $\mathbb{K}_i \equiv [K_i^{w-1}, \ldots, K_i^1, K_i^0]$. At block 408, the point Q is set initially at the point at infinity, i.e. set Q=$\mathcal{O}$.

Blocks 410-414 represent an evaluation stage. At block 410 a loop is entered, such as a for-loop with index i. The loop counts down from i=d–1 to 0 by –1. Within the loop: at block 412, set Q=2Q; and at block 414, set Q=Q+$\mathbb{K}_i$P. At block 416, return Q, wherein Q=kP.

The comb method stores $2^w$–1 points in the pre-computation stage. An estimate can be made of the time cost of the comb method. In the pre-computation stage, [$b_{w-1}$, . . . , $b_1$, $b_0$]P needs to be calculated for ($b_{w-1}$, . . . , $b_1$, $b_0$)∈$Z_2^w$. To achieve this, $2^d P$, $2^{2d}P$, . . . , $2^{(w-1)d}P$ are first calculated, which costs (w–1)d doubling operations. Then all possible combinations of only two nonzero bits in [$b_{w-1}$, . . . , $b_1$, $b_0$]P are calculated from the results of doubling operations. There are $C_w^2$ such combinations. Each combination uses one point addition. There are $C_w^2$ point additions in this step. In the next step, all combinations with exactly three nonzero bits are calculated. There are $C_w^3$ such combinations. Each needs one point addition from the previously calculated results. Therefore, this step costs $C_w^3$ point additions. This procedure continues until all bits are nonzero. The total number of point additions in the pre-computation stage is therefore $$\sum_{i=2}^{w} C_w^i = \sum_{i=0}^{w} C_w^i - C_w^1 - C_w^0 = 2^w - w - 1.$$

And therefore, the time cost in the pre-computation stage is $$\{(w-1)d\}D + \{(2^w-w-1)\}A.$$

To estimate the time cost in the evaluation stage, we assume the most significant column of $\{\mathbb{K}_i\}$ is not zero, i.e., $\mathbb{K}_{d-1}\neq 0$.

Then the number of doubling operations in the evaluation stage is (d−1). If $\mathbb{K}_i=0$, then the point addition in block 414 is not needed. If we assume k is uniformly distributed, the probability that $\mathbb{K}_i \neq 0$ is $$\frac{2^w - 1}{2^w},$$

and the average number of point additions is $$\frac{2^w - 1}{2^w}(d - 1).$$

Therefore, the average time cost in the evaluation stage is approximately $$\{(d-1)\}D + \left\{\frac{2^w - 1}{2^w}(d-1)\right\}A.$$

This cost is much smaller than the time cost in the evaluation stage for the m-ary method, which is $$\{w(d-1)\}D + \left\{\frac{2^w - 1}{2^w}(d-1)\right\}A$$

as derived previously. This gain at the evaluation stage is at the cost of higher time cost at the pre-computation stage for the comb method. The total time cost of the comb method is $$\{(w-1)d + (d-1)\}D + \left\{(2^w - w - 1) + \frac{2^w - 1}{2^w}(d-1)\right\}A =$$

$$\{wd - 1\}D + \left\{(2^w - w - 1) + \frac{2^w - 1}{2^w}(d-1)\right\}A.$$

Side-Channel Attacks and Countermeasures

Two types of power analysis attacks are the Simple Power Analysis (SPA) and the Differential Power Analysis (DPA). The SPA analyzes a single trace of power consumption in a crypto-device during scalar multiplication. A branch instruction condition can be identified from the recorded power consumption data. This represents continuity of elliptic curve doubling operation. If the double-and-add method is used in calculating scalar multiplication, the value $b_i$ of each bit of the secret multiplier k is revealed by this attack. For scalar multiplication methods, though SPA cannot deduce the value for each digit $s_i$ or $a_i$ for add-and-subtract or m-ary methods, or $\mathbb{K}_i$ in the comb method, it can detect if the digit or $\mathbb{K}_i$ is zero or not, which constitutes an information leak.

The DPA records many power traces of scalar multiplications, and uses correlation among the records and error correction techniques to deduce some or all digits of the secret k. DPA is more complex yet powerful than SPA. An SPA-resistant scalar multiplication method is not necessarily resistant to DPA attacks, however, many countermeasures can be used to transform an SPA-resistant method to a DPA-resistant method. A countermeasure is to make execution, and thus power consumption, different for identical inputs. Randomization is usually employed to achieve this effect. A number of randomizing approaches are feasible, including: randomizing input point in projective coordinates; randomizing exponential parameter representation; randomizing elliptic curve equation; and randomizing field representation. Additionally, each of these randomizing approaches can be applied to transform SPA-resistant methods disclosed herein to be resistant to DPA attacks.

To be effective, an ECC must provide countermeasures to SPA attacks. The particular approach of the implementations of the ECC disclosed herein is to make execution of scalar multiplication independent of any specific value of the multiplier k. For example, a simple way to make the double-and-add method resistant to SPA attacks is to remove the branching operation in the method so that the same operations are applied no matter $b_i$ is 0 or 1. Accordingly, a double-and-add-always method may be configured.

Figure 5:
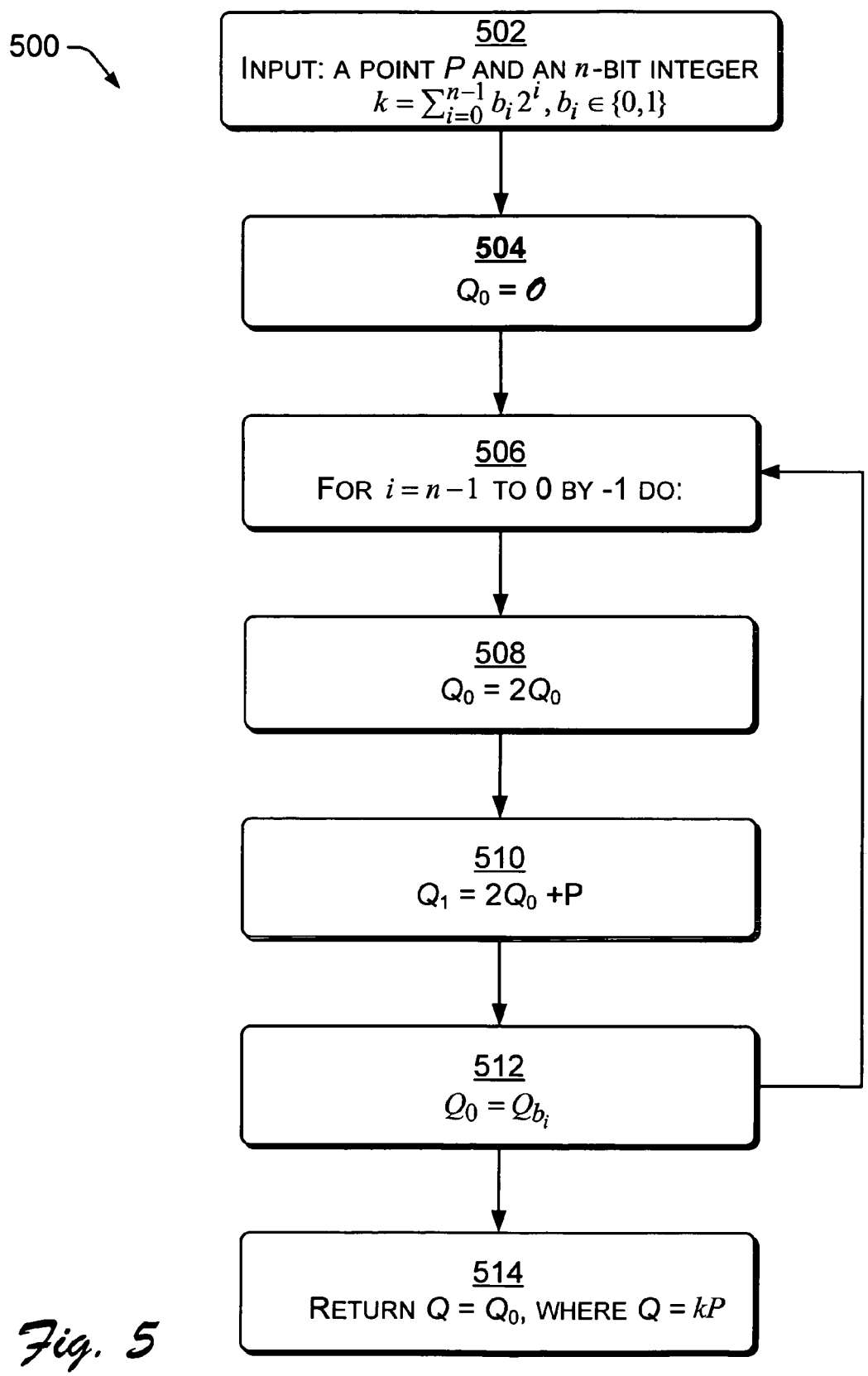
FIGS. 5 and 6 illustrate exemplary existing elliptic curve point multiplication methods or corresponding recoding methods resistant to simple power analysis.

FIG. 5 shows a double-and-add-always method 500 to provide SPA resistance. At block 502, input to the double-and-add-always method 500 includes a point P and an n-bit integer $$k = \sum_{i=0}^{n-1} b_i 2^i,$$

$b_i \in \{0,1\}$. At block 504, the point $Q_0$ is set initially at the point at infinity, i.e. set $Q_0 = \mathcal{O}$. At block 506, a loop is entered, such as a for-loop with index i. The loop counts down from i=n−1 to 0 by −1. Within the loop: at block 508, set $Q_0 = 2 Q_0$; at block 510, set $Q_1 = Q_0 + P$; and at block 512, set $Q_0 = Q_{b_i}$. At block 514, return $Q = Q_0$, wherein Q is of the form Q=kP.

Another strategy to protect against SPA attack is to extend $\mathbb{K}_i$ in the comb method 400 of FIG. 4 to a signed representation ($\mathbb{K}'_i$, $s_i$), where each $\mathbb{K}'_i$ is nonzero. The following procedure is used to obtain such a signed representation ($\mathbb{K}'_i$, $s_i$) for an odd integer k represented by $\mathbb{K}_i$, 0≤i<d, in the comb method. Let $s_0 = 1$ and construct the rest by setting ($\mathbb{K}'_i$, $s_i$)=($\mathbb{K}_{i-1}$, $s_{i-1}$)

($\mathbb{K}'_{i-1}$, $s_{i-1}$)=($\mathbb{K}_{i-1}$, $-s_{i-1}$)

if $K_i = 0$, and ($\mathbb{K}'_i$, $s_i$)=($\mathbb{K}_i$, $s_{i-1}$)

($\mathbb{K}'_{i-1}$, $s_{i-1}$)=($\mathbb{K}_{i-1}$, $s_{i-1}$)

otherwise.

The comb method uses this signed representation to the conventional comb method to calculate (k+1)P for even k and (k+2)P for odd k. The point 2P is then calculated. The point P or 2P is subtracted from the result of the conventional comb method to obtain the desired point kP. The comb method has the same time and space cost as the original comb method has in the pre-computation stage, i.e., storage of $2^w - 1$ points and $\{(w-1)d\}D + \{(2^w - w - 1)\}A$. The evaluation stage costs d−1 point additions and d−1 doublings. The last stage after the conventional comb method costs one doubling and one subtraction. Therefore the total cost is (w−1)d+(d−1)+1=wd doubling operations and $(2^w - w - 1)+(d-1)+1 = 2^w - w + d - 1$ adding operations. Compared with the method 400 of FIG. 4, this method has the same storage cost and a little higher time cost.

A further SPA-resistant m-ary scalar multiplication method for an integer $$k = \sum_{i=0}^{d} a_i 2^{wi}$$

with $a_i \in \{0, 1, \ldots, 2^w-1\}$ first converts k to another representation $$k = \sum_{i=0}^{d'} a'_i 2^{wi}$$

such that $a'_i \in \{-2^w, \pm 1, \pm 2, \ldots, \pm(2^{w-1}-1), 2^{w-1}\}$ and d' is either d or d+1. Intuitively, this recoding method replaces 0 digits by $-2^w$ and adjusts the next more significant digit to keep k unchanged. The recoding method is expressed recursively with two auxiliary values $c_i$ and $t_i$, $0 \leq c_i \leq 2$ and $0 \leq t_i \leq 2^w+1$. Set $c_0=0$. Then, for $i=0, \ldots, d+1$, let $t_i = a_i + c_i$ and $$(c_{i+1}, a'_i) = \begin{cases} (1, -2^w) & \text{if } t_i = 0 \\ (0, t_i) & \text{if } 0 < t_i < 2^{w-1} \\ (1, -2^w + t_i) & \text{if } 2^{w-1} < t_i < 2^w \\ (2, -2^w) & \text{if } t_i = 2^w \\ (1, 1) & \text{if } t_i = 2^w + 1 \end{cases}$$

Note that the equation $c_{i+1} \cdot 2^w + a'_i = t_i$ always holds.

After the conversion, this scalar multiplication method is exactly the same as the m-ary method 300 of FIG. 3 for $m=2^w$, except that the pre-computation stage needs to calculate 2P, 3P, ..., $[2^{w-1}]P$, and $[-2^w]P$. Since the sum of doublings and additions remains the same and doubling is more efficient than addition with projective coordinates that is typically used in applications, we would like to use doubling operations as many as possible in this stage. The most efficient scheme is to calculate using Eq. 1, resulting in the cost $(2^{w-2}+1)D+(2^{w-2}-1)A$ for the pre-computation stage. The evaluation stage costs $w(d-1)D+(d-1)A$ if $d'=d$ or $wdD+dA$ if $d'=d+1$. Therefore, the total cost is at least $(2^{w-2}+wd-w+1)D+(2^{w-2}+d-2)A$. Additionally, the pre-computation stage remembers $2^{w-1}+1$ points.

A further SPA-resistant odd-only m-ary scalar multiplication method is based on the idea of converting an odd integer $$k = \sum_{i=0}^{d} a_i 2^{wi}$$

with $a_i \in \{0, 1, \ldots, 2^w-1\}$ to another representation $$k = \sum_{i=0}^{d} a'_i 2^{wi}$$

such that $a'_i \in \{\pm 1, \pm 3, \ldots, \pm(2^w-1)\}$. This can be achieved with the following recoding method.

Figure 6:
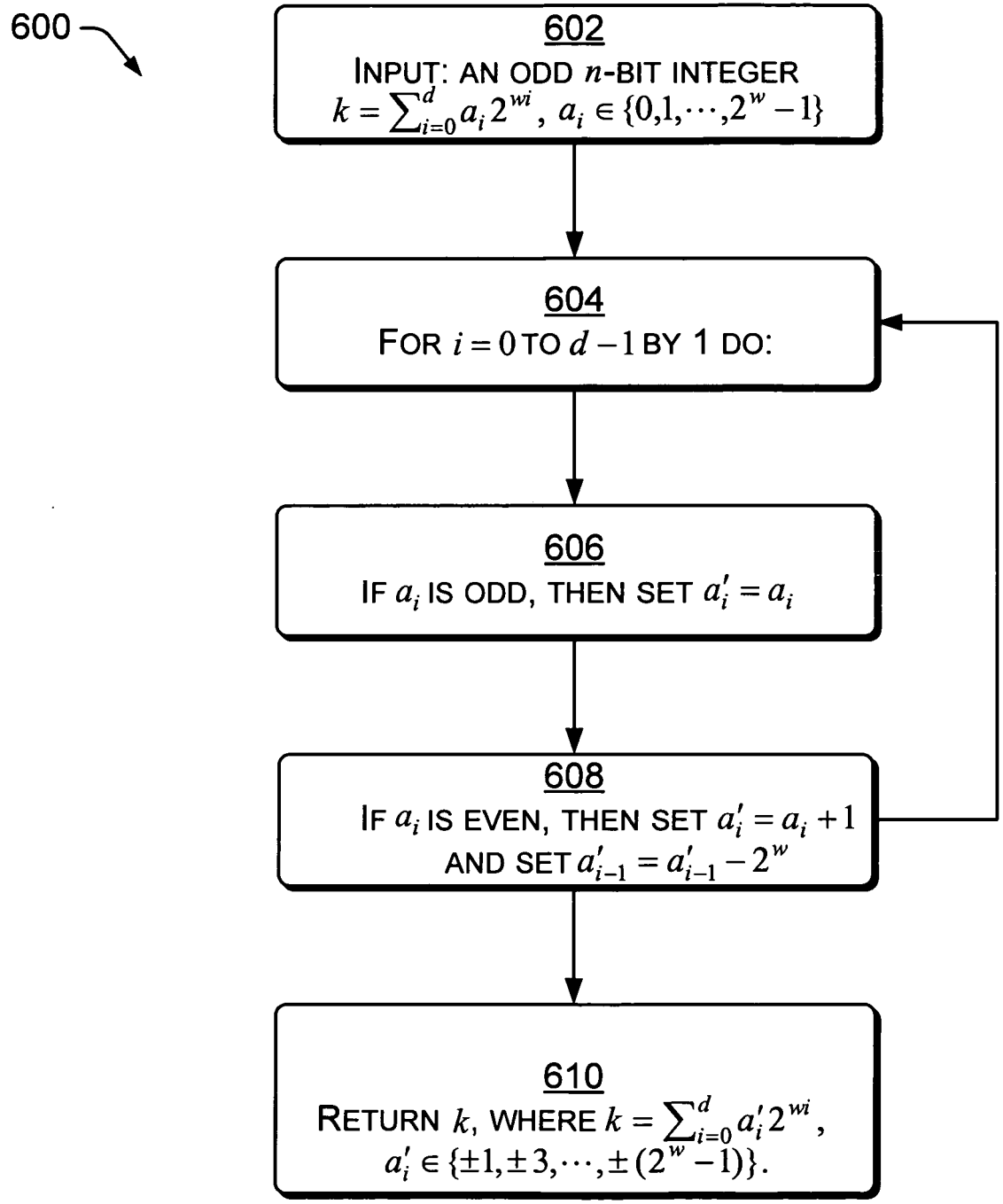

FIG. 6 shows a further SPA-resistant odd-only m-ary recoding method 600 for an odd scalar. At block 602, input to the odd-only m-ary recoding method 600 includes an odd n-bit integer $$k = \sum_{i=0}^{d} a_i 2^{wi}$$

with $a_i \in \{0, 1, \ldots, 2^w-1\}$. At block 604, a loop is entered, such as a for-loop with index i. The loop counts from $i=0$ to $d-1$ by 1. Within the loop: at block 606, if $a_i$ is odd, then set $a'_i = a_i$; and at block 608, if $a_i$ is even, then set $a'_i = a_i + 1$ and $a'_{i-1} = a'_{i-1} - 2^w$. At block 610, return output $$k = \sum_{i=0}^{d} a'_i 2^{wi}$$

with $a'_i \in \{\pm 1, \pm 3, \ldots, \pm(2^w-1)\}$.

Using this conversion, the m-ary method 300 of FIG. 3 is used with $m=2^w$ to calculate $[k+1]P$ for even k and $[k+2]P$ for odd k. P or 2P is then subtracted from the result of method 300 of FIG. 3 to obtain the desired point kP. Method 600 needs to store $2^{w-1}$ points P, 3P, 5P, ..., $[2^w-1]P$. These points can be calculated in the pre-computation stage by first calculating 2P and then the rest iteratively with the equation $[i]P=2P+[i-2]P$. The cost in this stage is $1D+(2^{w-1}-1)A$. The for-loop in the evaluation stage costs $w(d-1)D+(d-1)A$ and the post-processing stage costs one doubling to calculate 2P and one subtraction to subtract either P or 2P. The total cost for OT's method is therefore $(wd-w+2)D+(2^{w-1}+d-1)A$.

Odd-Only Comb Method

An embodiment of an odd-only comb method includes significant advancements over known comb methods in ECCs. The odd-only comb embodiment transforms all the comb bit-columns $\{K_i = [K_i^{w-1}, \ldots, K_i^1, K_i^0]\}$ of a scalar k into a signed nonzero representation $\{K'_i = [K'^{w-1}_i, \ldots, K'^1_i, K'^0_i] \neq 0\}$. In a significant departure from known technology, every $K'_i$ generated is a signed odd integer. More specifically, the embodiment generates $K'^0_i \in \{1, \overline{1}\}$ and $K'^j_i \in \{0, K'^0_i\}$, $j \neq 0$ for each comb bit-column $K'_i = [K'^{w-1}_i, \ldots, K'^1_i, K'^0_i]$, where $\overline{1}$ is defined as $-1$. Advantageously, the pre-computation stage only needs to calculate and save half of the points in conventional comb methods in ECCs.

Figure 7:
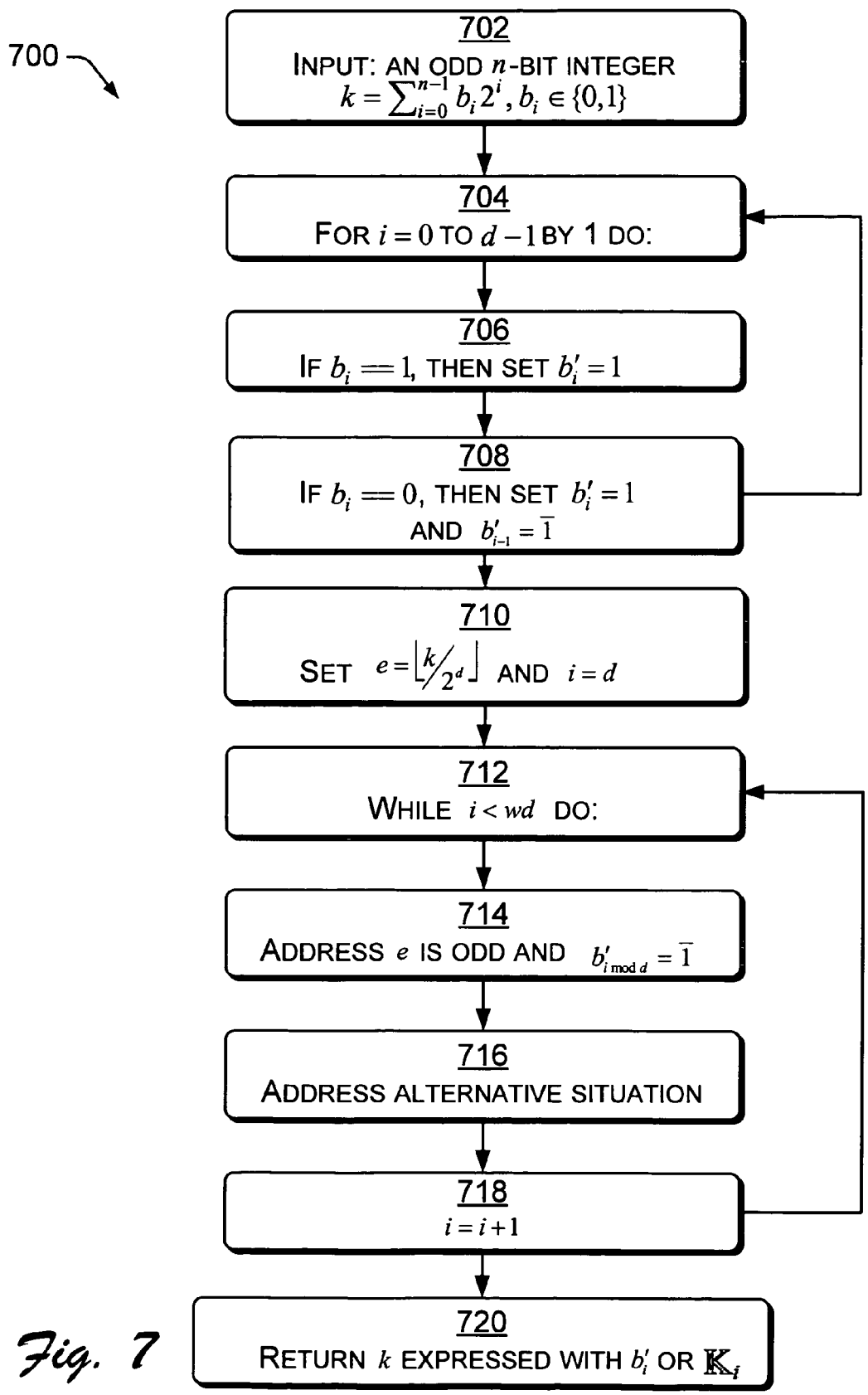
FIG. 7 illustrates an example of signed odd-only comb recoding method for an odd scalar.

FIG. 7 shows exemplary detail of a signed odd-only comb recoding method 700 for an odd scalar. Method 700 performs elliptic curve calculations adapted for use in comb elliptic curve point multiplication. The recoding method 700 is configured for a window width $w \geq 2$ where $$d = \left\lceil \frac{n+1}{w} \right\rceil.$$

Input to the method 700 includes an odd n-bit integer $$k = \sum_{i=0}^{n-1} b_i 2^i$$

with $b_i \in \{0,1\}$. Output from the method includes $$k = \sum_{i=0}^{wd-1} b'_i 2^i \equiv K'^{w-1} \| \cdots \| K'^1 \| K'^0,$$

where each $K'^j$ is a binary string of d bits long, and padding with 0 on the left if necessary. Within FIG. 7, let $K'^j_r$ denote the r-th bit of $K'^j$, i.e., $K'^j_r \equiv b'_{jd+r}$. Define $\mathbb{K}'_r \equiv [K'^{w-1}_r, \ldots, K'^1_r, K'^0_r]$. The output satisfies $K'^0_r \in \{1, \overline{1}\}$ and $K'^j_r \in \{0, K'^0_r\}$ for $j \neq 0$ and $0 \leq r < d$.

Referring to FIG. 7, the operation of the signed odd-only comb recoding method 700 for an odd scalar can be understood. At block 702, input is set to an odd n-bit integer according to $$k = \sum_{i=0}^{n-1} b_i 2^i$$

with $b_i \in \{0,1\}$. At block 704, a loop is entered, such as a for-loop with index i. The loop counts from i=0 to d−1 by 1. Within the loop: at block 706, if $b_i=1$ then set $b'_i=1$; and at block 708, if $b_i=0$ then set $b'_i=1$ and $b'_{i-1}=\overline{1}$. Upon leaving the loop at block 710, set $$e = \left\lfloor \frac{k}{2^d} \right\rfloor$$

and i=d. At block 712, a loop is entered, such as a while-loop with index i, configured to continue while i<wd. Within the loop: at block 714, the situation wherein e is odd and $b'_{i\ mod\ d} = \overline{1}$ is addressed by setting $b'_i = \overline{1}$ and $$e = \left\lfloor \frac{e}{2} \right\rfloor + 1;$$

and at block 716, the alternative situation is addressed by setting $b'_i = e \bmod 2$, and $$e = \left\lfloor \frac{e}{2} \right\rfloor.$$

At block 718, i is incremented by setting i=i+1. At block 720, the output $$k = \sum_{i=0}^{wd-1} b'_i 2^i \equiv K'^{w-1} \| \cdots \| K'^1 \| K'^0,$$

where each $K'^j$ is a binary string d bits long, having $\{b'_i\}$ as constituent bits, and padding with 0 on the left if necessary, is returned.

The method 700 first converts each bit of the last (i.e., the least significant) d bits to either 1 or $\overline{1}$ in by exploiting the fact that $1 \equiv 1\ \overline{1}\ \overline{1} \ldots \overline{1}$ In other words, each bit $K'^0_r$, $0 \leq r < d$, in $K'^0$ is either 1 or $\overline{1}$. The rest of the recoding method processes each bit from the d-th bit towards the highest bit. If the current bit is 1 and has a different sign as the least significant bit in the same comb bit-column $K_i$, the current bit is set to $\overline{1}$ and the value consisting of the remaining higher bits is added by 1 to keep the value of k unchanged. This process generates wd bits $\{b'_i\}$ to represent an odd n-bit integer k.

Therefore, the method 700 of FIG. 7, when given an odd scalar k, outputs a sequence of bit-strings $\{b'_i\}$ and $\{\mathbb{K}'_r \equiv [K'^{w-1}_r, \ldots, K'^1_r, K'^0_r]\}$ such as $$k = \sum_{i=0}^{wd-1} b'_i 2^i$$

and for $\mathbb{K}'_r$, $K'^1_r$, $K'^0_r \in \{1, \overline{1}\}$ and $K'^j_r \in \{1, K'^0_r\}$ for $j \neq 0$ and $0 \leq r < d$, where $K'^j_r \equiv b'_{jd+r}$. The preceding statement can be proved as follows. It is obvious that each $\mathbb{K}'_i$ generated by method 700 satisfies the conditions that $K'^0_r \in \{1, \overline{1}\}$ and $K'^j_r \in \{0, K'^0_r\}$ for $j \neq 0$: Since k is odd, $b_0=1$. Blocks 704-708 set the last bit $b'_r$ in $\mathbb{K}'_r$ to be either 1 or $\overline{1}$. Therefore, $K'^0_r \equiv b'_r \in \{1, \overline{1}\}$. In method 700, if $b'_{i\ mod\ d} = \overline{1}$ $b'_i$ is set to $\overline{1}$ by block 714 or to 0 by block 716. If $b'_{i\ mod\ d} = 1$, $b'_i$ is set to either 0 or 1 by block 716. This means that all bits except the least significant bit in each $\mathbb{K}'_r$ either is 0 or has the same value as the least significant bit.

To prove $$k = \sum_{i=0}^{wd-1} b'_i 2^i,$$

we first prove $$\sum_{i=0}^{d-1} b_i 2^i = \sum_{i=0}^{d-1} b'_i 2^i. \quad (2)$$

This can be done by induction to prove $$\sum_{i=0}^{j} b_i 2^i = \sum_{i=0}^{j} b'_i 2^i$$

for $0 \leq j < d$. The equation holds for $j=0$ since k is odd. If the equation is true for $j-1 < d$, then Steps 2 and 3 in method 700 ensures that the equation is also true for $j < d$. By setting $j=d-1$, we have the desired equation.

Denote the value of e as $e_i$ when it comes into the i-th loop before block 714, where $i > d$. We assert that $$e_i 2^i + \sum_{j=0}^{i-1} b'_i 2^j = k \qquad (3)$$

is always true for $i \geq d$. This can be done by induction. By using Eq. 2, we have $$k = e_d 2^d + \sum_{i=0}^{d-1} b_i 2^i = e_d 2^d + \sum_{i=0}^{d-1} b'_i 2^i.$$

This proves that Eq. 3 holds for $i=d$. Assume Eq. 3 is true for $i \geq d$. If $e_i$ is odd and $b'_{i \bmod d} = \bar{1}$, we have $b'_i = \bar{1}$ and $$e_{i+1} = \left\lfloor \frac{e_i}{2} \right\rfloor + 1 = \frac{e_i - 1}{2} + 1,$$

and $$e_{i+1} 2^{i+1} + \sum_{j=0}^{i} b'_i 2^j = \left(\frac{e_i - 1}{2} + 1\right) 2^{i+1} - 2^i + \sum_{j=0}^{i-1} b'_i 2^j = e_i 2^i + \sum_{j=0}^{i-1} b'_i 2^j = k.$$

The same procedure can be used to prove that $$e_{i+1} 2^{i+1} + \sum_{j=0}^{i} b'_i 2^j = e_i 2^i + \sum_{j=0}^{i-1} b'_i 2^j = k$$

when $e_i$ is even or $b'_{i \bmod d} = 1$. This means that Eq. 3 is also true for $i+1$. Therefore Eq. 3 holds for $i \geq d$.

The last thing we need to prove is $e_{wd} = 0$. Because k is an integer of n bits, $$e_d = \left\lfloor \frac{k}{2^d} \right\rfloor$$

is an integer of n−d bits: $e_d < 2^{n-d}$. We would like to use induction to prove that for $n \geq i \geq d$ $$e \leq 2^{n-i}. \qquad (4)$$

We have already proved when $i=d$. Suppose it is true for i, $n > i \geq d$. If $e_i$ is odd, the inequality implies that $e_i \leq 2^{n-i} - 1$. In this case, blocks 714-716 give $$e_{i+1} \leq \left\lfloor \frac{e_i}{2} \right\rfloor + 1 \leq \left\lfloor \frac{2^{n-i} - 1}{2} \right\rfloor + 1 = 2^{n-(i+1)} - 1 + 1 = 2^{n-(i+1)},$$

i.e., Eq. 3 is true for $i+1$ in this case. If $e_i$ is even, then from block 716, $$e_{i+1} \leq \left\lfloor \frac{e_i}{2} \right\rfloor \leq \left\lfloor \frac{2^{n-i}}{2} \right\rfloor = 2^{n-(i+1)}.$$

Eq. 3 still holds. In other words, Eq. 4 is true for $i+1 \leq n$. Therefore, Equation (4) is proved to be true for $n \geq i \geq d$. Eq. 4 derives that $e_n \leq 2^0 = 1$.

Since $$d = \left\lceil \frac{n+1}{w} \right\rceil,$$

we have $n+1 \leq wd$. If $n+1 = wd$, then $e_{wd-1} \equiv e_n \leq 1$. If $n+1 < wd$, then from blocks 714-716, $$e_{n+1} \leq \left\lfloor \frac{e_n}{2} \right\rfloor + 1 \leq \left\lfloor \frac{1}{2} \right\rfloor + 1 = 1.$$

Continuing with this process, we also have $e_{wd-1} \leq 1$. In other words, we always have $e_{wd-} \leq 1$. From blocks 706-708, we have $b'_{d-1} = 1$. When $i = wd-1$ in the loop of blocks 712-718, since $b'_{wd-1 \bmod d} = b'_{d-1} = 1$, block 716 is executed, i.e., $$e_{wd} = \left\lfloor \frac{e_{wd-1}}{2} \right\rfloor \leq \left\lfloor \frac{1}{2} \right\rfloor = 0.$$

Applying this result to Eq. 3 yields the desired result, $$k = \sum_{i=0}^{wd-1} b'_i 2^i.$$

Figure 8:
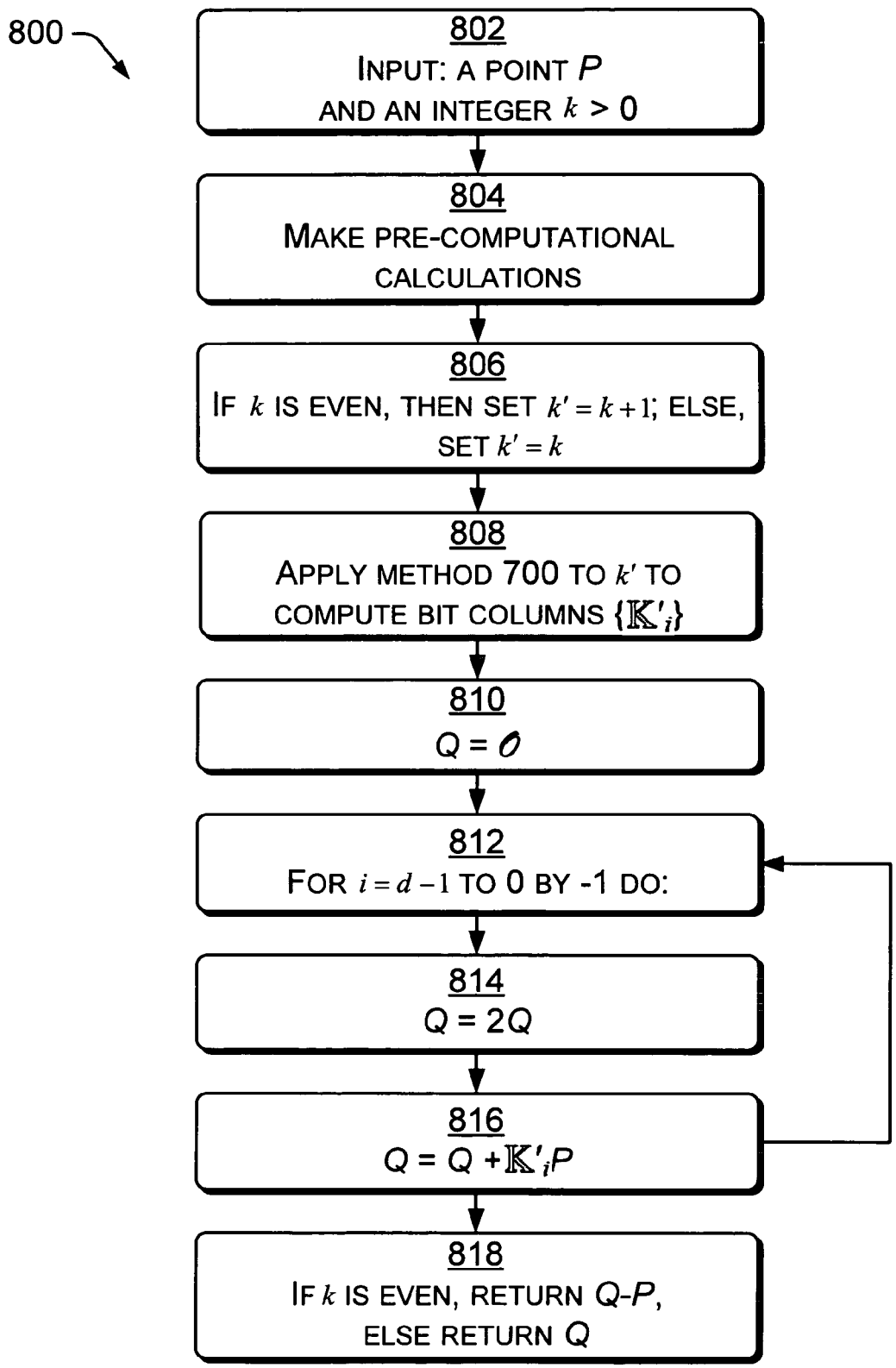
FIG. 8 illustrates an example of a signed odd-only comb elliptic curve point multiplication method for odd or even scalars.

The recoding method 700 of FIG. 7 works only with odd scalars. If a scalar k is an even integer, the method 800 of FIG. 8 may be utilized. In FIG. 8, we first calculate the point multiplication for the odd scalar $k' = k+1$, and then subtract P from the result to obtain the desired result kP.

FIG. 8 shows the operation of the signed odd-only comb method 800. At block 802, input including a point P and an integer $k > 0$ is received. A pre-computational stage includes blocks 804-810. At block 804, pre-computational calculations are made, including computation of $[b_{w-1}, \ldots, b_2, b_1, 1]P$ for all $(b_{w-1}, \ldots, b_2, b_1) \in (Z_2)^{w-}$. At block 806, if k is even then set k'32 k+1; otherwise set k'=k. (Note that we could also set k'=k−1 if k is even and set k'=k otherwise.) At block 808, method 700 of FIG. 7 is applied to k' to compute the corresponding comb bit-columns $\mathbb{K}'_0, \mathbb{K}'_1, \ldots \mathbb{K}'_{d-1}$. At block 810, the point Q is set initially at the point at infinity, i.e. set $Q = \mathcal{O}$. Blocks 812-818 constitute an evaluation stage. At block 812, a loop is entered, such as a for-loop with index i. The loop counts down from $i = d-1$ to 0 by −1. Within the loop: at block 814, set Q=2Q; and at block 816, set $Q = Q + \mathbb{K}'_i P$. At block 818, the output in the form of Q=kP is returned, wherein if k is even then Q−P is returned, otherwise Q is returned. (Note that if k'=k−1, then we add P when k is even.)

If the least significant bit of $\mathbb{K}'_i$ is $\bar{1}$, we have $\mathbb{K}'_i = -|\mathbb{K}'_i|$. In this case, block 816 in method 800 actually executes $Q=Q-|\mathbb{K}'_i|P$.

In practical ECC applications, only elliptic curve points in a subgroup with a large prime order $\rho$ are actually used. In this case, the signed odd-only comb method 800 can be modified to remove the post-processing block 818 by exploiting that facts that $\rho-k$ is odd for even k, and $[\rho-k]P=-kP$. This modified method is described in FIG. 9.

Figure 9:
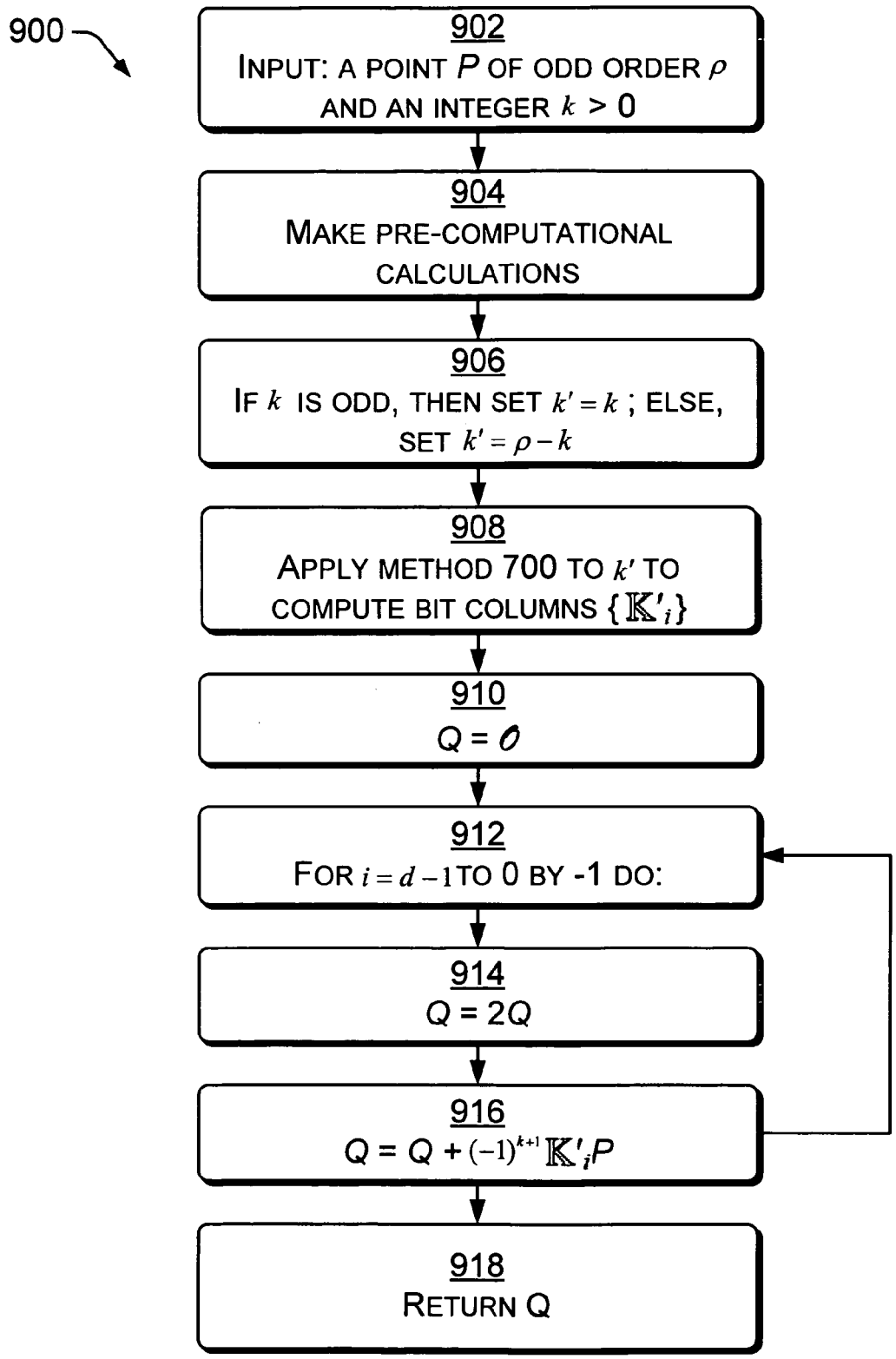
FIG. 9 illustrates an example of a signed odd-only comb elliptic curve point multiplication method for a point of odd order.

FIG. 9 shows the operation of a signed odd-only comb method for a point of odd order. At block 902, input including a point P of odd order $\rho$ and an integer k>0 are received. A pre-computational stage includes blocks 904-910. At block 904, pre-computational calculations are made. For example, $[b_{w-1}, \ldots, b_2, b_1, 1]P$ are computed for all $(b_{w-1}, \ldots, b_2, b_1) \in (Z_2)^{w-1}$. At block 906, k' is set. In particular, if k is odd, then set k'=k, else set k'=$\rho$-k. At block 908, method 700 of FIG. 7 is applied to k', thereby computing the comb bit-columns $\mathbb{K}'_0, \mathbb{K}'_1, \ldots, \mathbb{K}'_{d-1}$ corresponding to k'. At block 910, the point Q is set initially at the point at infinity, i.e. set Q=$\mathcal{O}$. Blocks 912-916 constitute an evaluation stage. At block 912, a loop is entered, such as a for-loop with index i. The loop counts down from i=d−1 to 0 by −1. Within the loop: at block 914, set Q=2Q; and at block 916, set Q=Q+$(-1)^{k+1}\mathbb{K}'_i P$. At block 918, Q in the form Q=kP is returned. Note that in block 916 above, Q is set to Q+$\mathbb{K}'_i$P for odd k, or Q−$\mathbb{K}'_i$P for even k.

In the recoding method 700 of FIG. 7, d is defined as $$\left\lceil \frac{n+1}{w} \right\rceil$$

instead of $$\left\lceil \frac{n}{w} \right\rceil$$

used in the original fixed base comb method 400 of FIG. 4. If n is indivisible by w, then d in our recoding method is exactly the same as the original comb method, i.e., $$\left\lceil \frac{n+1}{w} \right\rceil = \left\lceil \frac{n}{w} \right\rceil.$$

But if n is divisible by w, our method's d is one larger than the d used in method 400, i.e., $$\left\lceil \frac{n+1}{w} \right\rceil = 1 + \left\lceil \frac{n}{w} \right\rceil.$$

Increasing d by one would lead to w−1 additional doublings in the pre-computation stage, and one additional addition and one additional doubling in the evaluation stage. Any additional operations are undesirable. Fortunately, most of the additional operations when n is divisible by w can be eliminated by thoughtful manipulation as described in the following modified comb method.

Figure 10:
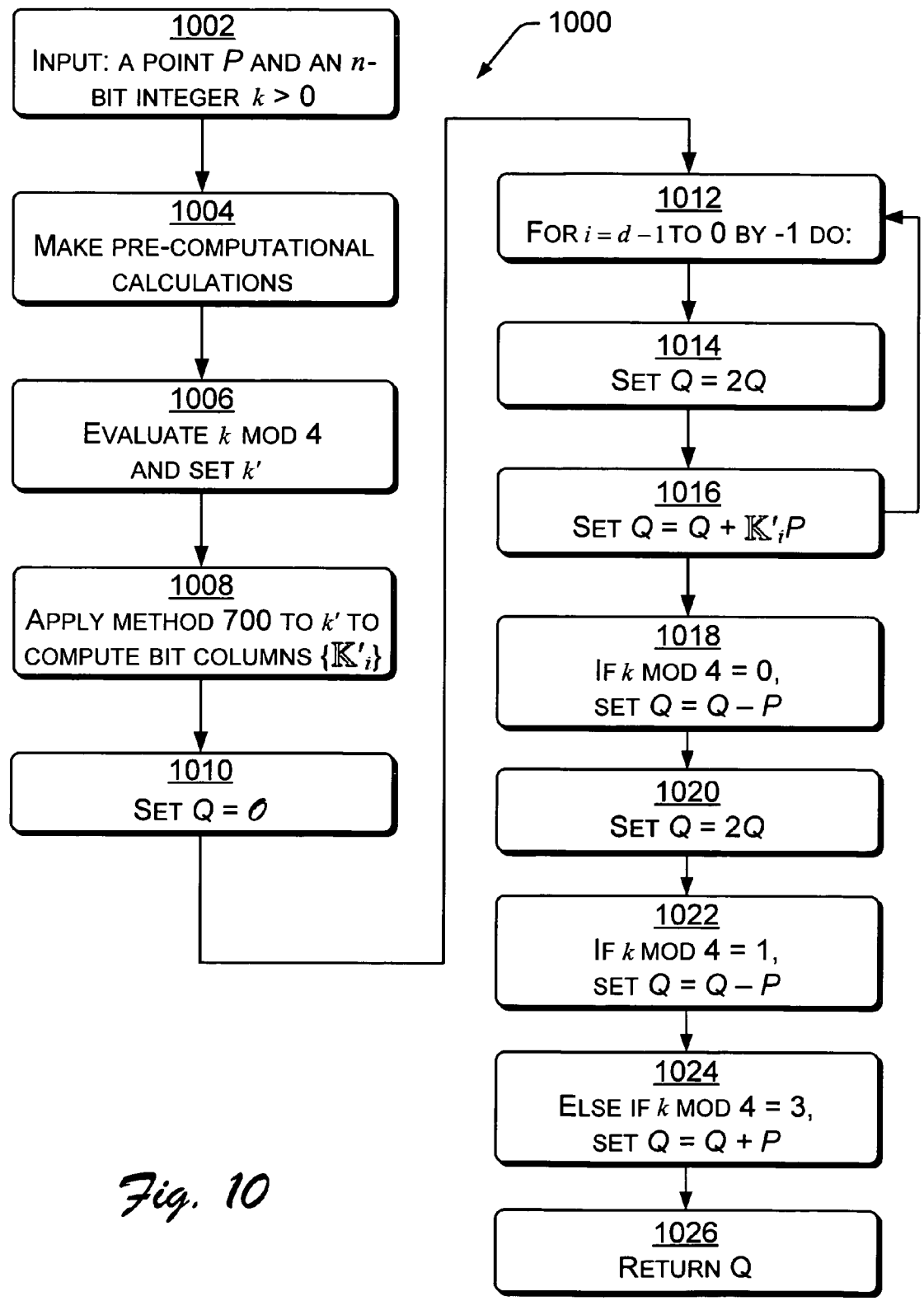
FIG. 10 illustrates an example of a signed odd-only comb elliptic curve point multiplication method for n divisible by w.

FIG. 10 shows the operation of a signed odd-only comb method for n divisible by w. At block 1002, input including a point P and an n-bit integer k>0 is received. A pre-computation stage includes blocks 1004-1010. At block 1004, pre-computational calculations are made. For example, $[b_{w-1}, \ldots, b_2, b_1, 1]P$ are computed for all $(b_{w-1}, \ldots, b_2, b_1) \in (Z_2)^{w-1}$. At block 1006, k mod 4 is evaluated, and k' is set. In particular: if k mod 4=0, then set k'=k/2+1; if k mod 4=1, then set k'=$\lceil$k/2$\rceil$; if k mod 4=2, then set k'=k/2; and if k mod 4=3, then set k'=$\lfloor$k/2$\rfloor$. At block 1008, method 700 is applied to k' to compute the corresponding comb bit-columns $\mathbb{K}'_0, \mathbb{K}'_1, \ldots \mathbb{K}'_{d-1}$. At block 1010, the point Q is set initially at the point at infinity, i.e. set Q=$\mathcal{O}$. An evaluation stage includes blocks 1012-1026. At block 1012, a loop is entered, such as a for-loop with index i. The loop counts down from i=d−1 to 0 by −1. Within the loop: at block 1014, set Q=2Q; and at block 1016, set Q=Q+$\mathbb{K}'_i$P. At block 1018, if k mod 4=0, then set Q=Q−P. At block 1020, set Q=2Q. At block 1022, if k mod 4=1, then set Q=Q−P; and at block 1024, if k mod 4=3, then set Q=Q+P. At block 1026, return Q in the form Q=kP.

Due to block 1006, the value of d used in method 1000 is equivalent to $$\left\lceil \frac{n}{w} \right\rceil,$$

the same as the original comb method 400. Compared with method 800, method 1000 saves w−1 doublings in the pre-computation stage when n is divisible by w. In this case, one addition is also saved in the evaluation stage if k mod 4=2. More performance comparison of various methods will be given later in this specification.

Methods 800 and 1000 are not SPA-resistant. Even though all the comb bit-columns $\{\mathbb{K}'_i\}$ are nonzero in both methods, the value of the last bit of a scalar k is detectable in block 818 of FIG. 8 by SPA, and information of the last two bits of a scalar k may leak out from the steps following block 1016 in FIG. 10 by SPA. Since all $\mathbb{K}'_i \neq 0$, the operations in the for loop for all the three comb methods 800, 900 and 1000 are a sequence of alternative point doubling and point addition, DADA . . . DADA, therefore do not leak any information about the secret scalar k to SPA. This implies that method 900 is a SPA-resistant comb method if we take every scalar k (or more specifically k' in block 906 of the FIG. 9) as an integer of $\lceil \log_2 \rho \rceil$ bits, where $\rho$ is the order of the point P. That is a typical assumption in studying SPA-resistant methods. By inserting potential dummy operations after the for-loop, we can convert the above SPA-nonresistant methods to SPA-resistant methods. Method 800 can be modified to the following SPA-resistant comb method.

Figure 11:
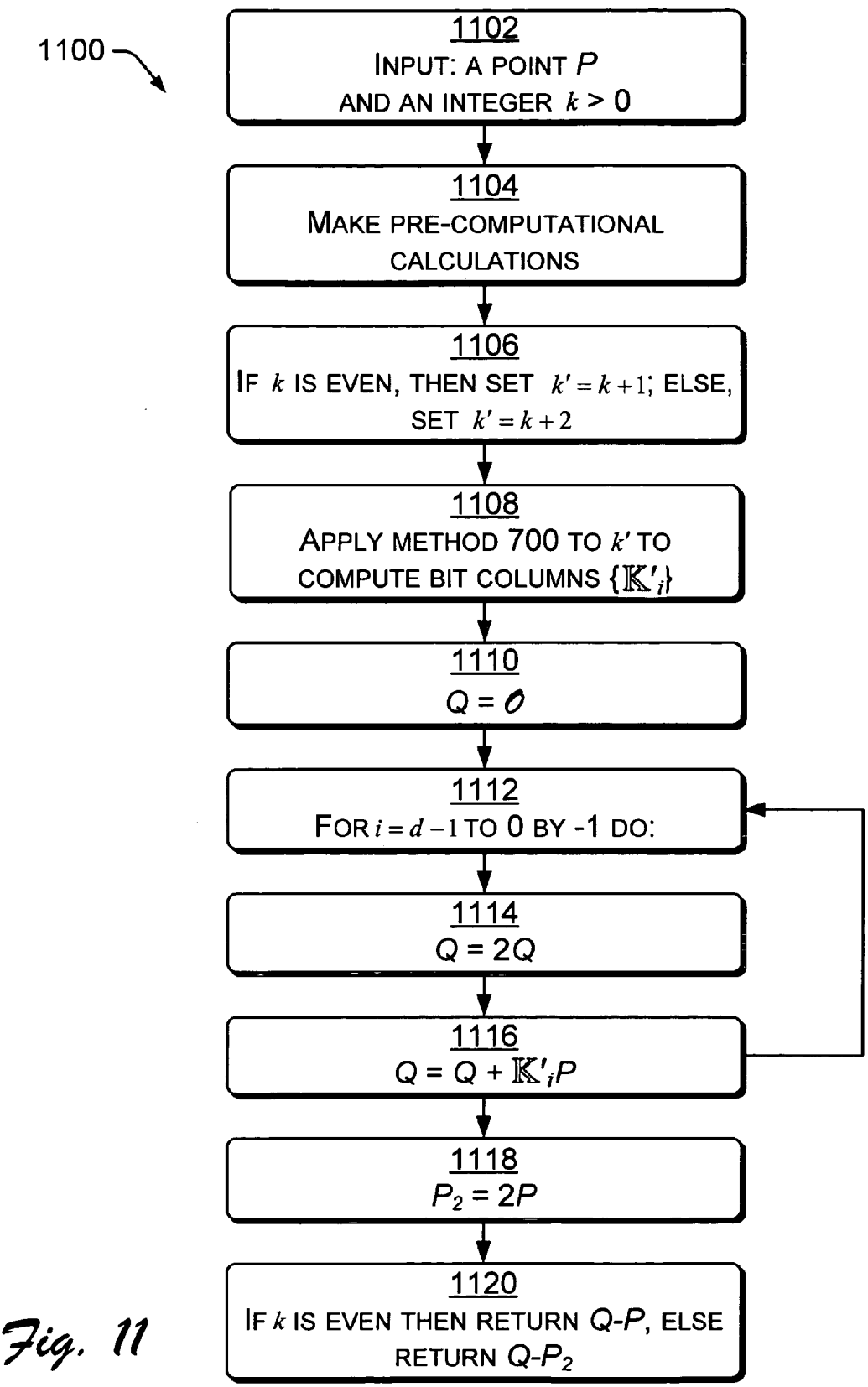
FIG. 11 illustrates an example of an SPA-resistant signed odd-only comb elliptic curve point multiplication method.

FIG. 11 shows operation of an SPA-resistant signed odd-only comb method 1100. At block 1102, input a point P and an integer k>0 is received. A pre-computation stage includes blocks 1104-1110. At block 1104, pre-computational calculations are made. For example, $[b_{w-1}, \ldots, b_2, b_1, 1]P$ are computed for all $(b_{w-1}, \ldots, b_2, b_1) \in (Z_2)^{w-1}$. At block 1106, if k is even then set k'=k+1, else set k'=k+2. At block 1108, method 700 is applied to k' to compute the corresponding comb bit-columns $\mathbb{K}'_0, \mathbb{K}'_1, \ldots \mathbb{K}'_{d-1}$. At block 1110, the point Q is set initially at the point at infinity, i.e. set Q=$\mathcal{O}$. An evaluation stage includes blocks 1112-1120. At block 1112, a loop is entered, such as a for-loop with index i. The loop counts down from i=d−1 to 0 by −1. Within the loop: at block 1114, set Q=2Q; at block 1116, set Q=Q+$\mathbb{K}'_i$P; and at block 1118, set $P_2$=2P. At block 1120, output in the form Q=kP is returned. In particular, if k is even then return Q−P else return Q−$P_2$.

As we mentioned previously, in studying SPA-resistant methods a scalar is considered as an integer of $\lceil \log_2 \rho \rceil$ bits where $\rho$ is the order of the point P. i.e., $n=\lceil \log_2 \rho \rceil$ in method 700 of FIG. 7. In this case, if $\lceil \log_2 \rho \rceil$ is divisible by w, the value of d used in method 1100 of FIG. 11 is one larger than the d in the original comb method 400 of FIG. 4, resulting in higher computational complexity. The following SPA-resistant method 1200 does not increase d and therefore removes the increased computational complexity.

Figure 12:
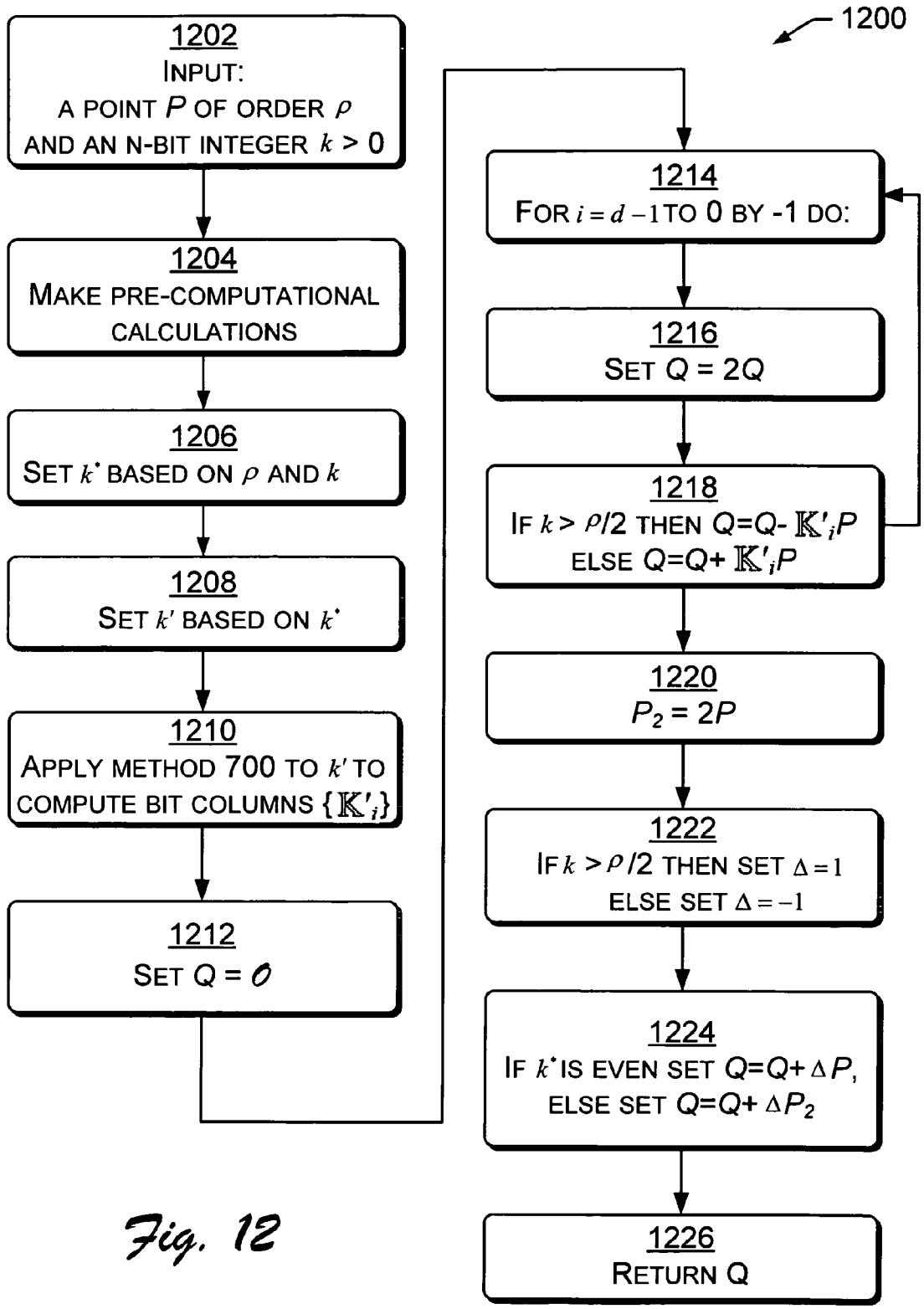
FIG. 12 illustrates an example of an SPA-resistant signed odd-only comb elliptic curve point multiplication method for $n=\lceil \log_2 \rho \rceil$ divisible by w.

FIG. 12 shows the operation of an SPA-resistant signed odd-only comb method 1200 for $n=\lceil \log_2 \rho \rceil$ divisible by w. At block 1202, input including a point P of order $\rho$ and an n-bit integer k>0 is received. A pre-computation stage includes blocks 1204-1212. At block 1204, pre-computational calculations are made. For example, $[b_{w-1}, \ldots, b_2, b_1, 1]P$ are computed for all $(b_{w-1}, \ldots, b_2, b_1) \in (Z_2)^{w-1}$. At block 1206, if $$k > \frac{\rho}{2}$$

then set $k^* = \rho - k$, else set $k^* = k$. At block 1208, if $k^*$ is even then set $k' = k^* + 1$, else set $k' = k^* + 2$. At block 1210, method 700 is applied to k' to compute the corresponding comb bit-columns $\mathbb{K}'_0, \mathbb{K}'_1, \mathbb{K}'_{d-1}$. At block 1212, the point Q is set initially at the point at infinity, i.e. set Q=0. An evaluation stage includes blocks 1214-1226. At block 1214, a loop is entered, such as a for-loop with index i. The loop counts down from i=d−1 to 0 by −1. Within the loop: at block 1216 set Q=2Q; and at block 1218, if $$k > \frac{\rho}{2}$$

then set $Q=Q-\mathbb{K}'_i P$ else set $Q=Q+\mathbb{K}'_i P$. At block 1220, set $P_2=2P$. At block 1222, if $$k > \frac{\rho}{2}$$

then set $\Delta=1$ else set $\Delta=-1$. At block 1224, if $k^*$ is even set $Q=Q+\Delta P$ else set $Q=Q+\Delta P_2$. At block 1226, Q is returned as output where Q=kP.

Note that in method 1200 of FIG. 12, block 1206 ensures $k^*$ less than or equal to $\rho/2$. Also, k' should be an integer of $\lceil \log_2 \rho \rceil - 1$ bits to ensure that d used in the method is equal to $$\frac{\lceil \log_2 \rho \rceil}{w}.$$

If not, we can set k' to $k^*-1$ for even $k^*$ and $k^*-2$ for odd $k^*$ in block 1206 to achieve the desired result. In this case, block 1222 sets $\Delta$ to −1 for $$k > \frac{\rho}{2}$$

and 1 otherwise.

Security of Operation

The security of the disclosed point multiplication methods against power analysis is discussed in this section. Security against SPA is addressed first, followed by description of how to transform the disclosed methods to resist DPA, second-order DPA, and other side channel attacks.

The comb methods 900, 1100, and 1200 exploit the fact that point subtraction is virtually the same as point addition for power analysis. In addition, the disclosed comb methods perform one point addition (or point subtraction) and one doubling at each loop in calculating point multiplication. This means that the same sequences are executed for all scalar k. Therefore SPA cannot extract any information about the secret k by examine the power consumption of the executions. In other words, comb methods 900, 1100, and 1200 are really SPA-resistant.

However, SPA-resistant point multiplication methods are not necessarily resistant to DPA attacks. Randomization projective coordinates or random isomorphic curves can be used to transform the disclosed methods into DPA-resistant methods.

Second-order DPA attacks might still be successfully applied to comb methods 900, 1100, and 1200 when the just-mentioned randomization schemes are used. Such second order attacks exploit the correlation between the power consumption and the hamming weight of the loaded data to determine which $\mathbb{K}'_i$ is loaded. To thwart such second-order DPA attacks, a scheme to randomize all pre-computed points after getting the point in the table may be used, so that there is no fixed hamming weight.

A recently proposed DPA attack is a refinement attack on many randomization schemes. This attack employs special points with one of coordinates being zero. Such a DPA attack may be addressed by simply choosing elliptic curves E: $y^2 = x^3 + ax + b$ defined over $F_p$ (p>3) wherein b is not a quadratic residue of modulo p, and to reject any point (x, 0) as an input point in applications of the disclosed scalar multiplication methods. If the cardinality $\#E(F_p)$ is a big prime number, points (x, 0) cannot be eligible input points since they are not on elliptic curves. Combining with the aforementioned randomization techniques and measures, the disclosed comb methods can thwart all power-analysis attacks.

Efficiency of Operation

The comb methods 800-1200 require storage of $2^{w-1}$ points. In the pre-computation stage of these comb methods, $2^d P, 2^{2d} P, \ldots, 2^{(w-1)d} P$ are first calculated. This costs (w−1)d point doublings. Then all possible combinations $[b_{w-1}, \ldots, b_2, b_1, 1]P$ with $(b_{w-1}, \ldots, b_2, b_1) \in (Z_2)^{w-1}$ are calculated in the same way as the pre-computation stage for method 400 of FIG. 4, which costs $2^{w-1}-1$ point additions. The total cost of the disclosed comb methods in the pre-computation stage is therefore $\{(w-1)d\}D + \{2^{w-1}-1\}A$. The time costs of the comb methods 800-1200 in the evaluation stage vary a little due to post-processing after the for-loop. Assume that the scalar k is randomly distributed, then the average cost in the evaluation stage is $$(d-1)D + \left(d - \frac{1}{2}\right)A$$

for method 800 of FIG. 8, (d−1)D+(d−1)A for method 900 of FIG. 9, $$dD + \left(d - \frac{1}{4}\right)A$$

for method 1000 of FIG. 10, and dD+dA for both methods 1100 and 1200 of FIGS. 11 and 12.

$$\left\lceil \frac{n+1}{w} \right\rceil$$

is one larger than n/w in this case, resulting in higher time cost.

TABLE 1

Comparison of space and average time costs for fixed-base comb method 400 and fixed-base comb methods 800-1000.

| | Method 400 | Method 800 | Method 900 | Method 1000 |
|---|---|---|---|---|
| d | $\left\lceil \frac{n}{w} \right\rceil$ | $\left\lceil \frac{n+1}{w} \right\rceil$ | $\left\lceil \frac{n+1}{w} \right\rceil$ | $\frac{n}{w}$ where $w\|n$ |
| Storage | $2^w - 1$ | $2^w - 1$ | $2^w - 1$ | $2^w - 1$ |
| Pre-Comp. Stage | $(w-1)dD$ $(2^w - w - 1)A$ | $(w-1)dD$ $(2^{w-1} - 1)A$ | $(w-1)dD$ $(2^{w-1} - 1)A$ | $(w-1)dD$ $(2^{w-1} - 1)A$ |
| Evaluation Stage | $(d-1)D$ $\frac{2^w - 1}{2^w}(d-1)A$ | $(d-1)D$ $\left(d - \frac{1}{2}\right)A$ | $(d-1)D$ $(d-1)A$ | $dD$ $\left(d - \frac{1}{4}\right)A$ |
| Total Cost | $(wd-1)D$ $\left(2^w - w - 1 + \frac{2^w - 1}{2^w}(d-1)\right)A$ | $(wd-1)D$ $\left(2^{w-1} + d - \frac{3}{2}\right)A$ | $(wd-1)D$ $(2^{w-1} + d - 2)A$ | $(wd-1)D$ $\left(2^{w-1} + d - \frac{5}{4}\right)A$ |

A comparison can be made between the fixed-base comb methods 800, 900 and 1000 of FIGS. 8-10 with the original fixed-base comb method 400 of FIG. 4. Table 1 lists the space and time costs for those methods. Comb methods 800-1000 in Table 1 store $2^{w-1}$, which is about half of the stored points of $2^{w-1}$ in the original comb method 400. In addition, comb methods 800-1000 save $2^{w-1} - w$ point additions than the original comb method 400 of FIG. 4 in the pre-computation stage. The evaluation stage has a similar time cost for all the four methods in Table 1. To maintain about the same storage space for pre-computed points, methods 800-1000 can be utilized in a manner such that the value of w is selected as $w = w_1 + 1$, one larger than the value $w = w_1$ used in comb method 400. This results in similar storage ($2^{w_1}$ vs. $2^{w_1} - 1$) as the comb method 400 yet faster computation in the evaluation stage, thanks to smaller d used in methods 800-1000.

A comparison can be made between the disclosed SPA-resistant comb methods 900, 1100, and 1200 of FIGS. 9, 11, and 12 with a modification of method 400 that is SPA-resistant. The space and time costs for those SPA-resistant methods are listed in Table 2. Again, SPA-resistant comb methods 900, 1100, and 1200 use about half of the storage for pre-computed points than a modified comb method 400, yet save $2^{w-} - w$ point additions in the pre-computation stage. Methods 1100 and 1200 have the same time cost as modified method 400 in the evaluation stage, while disclosed method 900 saves one point doubling and one point addition in this stage. From the data in Table 2, method 900 is the most efficient SPA-resistant comb method if n is not divisible by w. When n is divisible by w, method 1200 is recommended since A comparison of the SPA-resistant embodiments disclosed herein with other SPA-resistant point multiplication methods is instructive. The space and time costs for the two SPA-resistant m-ary scalar multiplication methods (one is an extended m-ary method that is SPA-resistant, and the other is an m-ary method using the recoding method 600 of FIG. 6) are listed in the second and third columns of Table 3. From Tables 2 and 3, the disclosed SPA-resistant comb methods 900, 1100, and 1200 of FIGS. 9, 11, and 12 store the same number of pre-computed points as the m-ary method using the recoding method 600, which is one point less than the other SPA-resistant m-ary method.

To make a point multiplication method resistant to SPA attacks, additional operations are needed to remove dependency of the cryptographic execution procedure on the specific value of k. This means that efficiency of a SPA-resistant method is lowered in general as compared to non-SPA-resistant method of a similar approach. The most efficient point multiplication method, if total cost in both pre-computation and evaluation stages combined is considered, is the signed m-ary window method that is not SPA-resistant. The space and time cost for the signed m-ary window method costs is listed in the first column of Table 3. This method requires fewer points to be stored yet runs faster than all SPA-resistant methods. The space and time penalty is of little consequence in many applications wherein security is the top priority. If only the evaluation stage is considered, the disclosed comb methods are faster than the signed m-ary window method.

TABLE 2

Comparison of space and average time costs for SPA-resistant comb methods ($n = \lceil \log_2 \rho \rceil$).

| | Conventional SPA-resistant Comb | Method 900 of FIG. 9 | Method 1100 of FIG. 11 | Method 1200 of FIG. 12 |
|---|---|---|---|---|
| d | $\lceil \frac{n}{w} \rceil$ | $\lceil \frac{n+1}{w} \rceil$ | $\lceil \frac{n+1}{w} \rceil$ | $\lceil \frac{n}{w} \rceil$ |
| Storage | $2^w - 1$ | $2^{w-1}$ | $2^{w-1}$ | $2^{w-1}$ |
| Pre-Comp. Stage | $(w-1)dD$ $(2^w - w - 1)A$ | $(w-1)dD$ $(2^{w-1} - 1)A$ | $(w-1)dD$ $(2^{w-1} - 1)A$ | $(w-1)dD$ $(2^{w-1} - 1)A$ |
| Evaluation Stage | $dD$ $dA$ | $(d-1)D$ $(d-1)A$ | $dD$ $dA$ | $dD$ $dA$ |
| Total Cost | $wdD$ $(2^w - w + d - 1)A$ | $(wd-1)D$ $(2^{w-1} + d - 2)A$ | $wdD$ $(2^{w-1} + d - 1)A$ | $wdD$ $(2^{w-1} + d - 1)A$ |

TABLE 3

Space and average time costs for non-SPA-resistant signed m-ary method (first column) and two conventional SPA-resistant m-ary methods ($n = \lceil \log_2 \rho \rceil$).

| | Signed m-ary window | A conventional SPA-resistant m-ary method | SPA-resistant m-ary method using recoding method 600 of FIG. 6 |
|---|---|---|---|
| d | $\lceil \frac{n}{w} \rceil$ | $\lceil \frac{n}{w} \rceil$ | $\lceil \frac{n}{w} \rceil$ |
| Storage | $2^{w-2}$ | $2^{w-1} + 1$ | $2^{w-1}$ |
| Pre Computation-Stage | $1D$ $(2^{w-2} - 1)A$ | $(2^{w-2} + 1)D$ $(2^{w-2} - 1)A$ | $1D$ $(2^{w-1} - 1)A$ |
| Evaluation Stage | $(wd - w)D$ $\left(\frac{wd+1}{w+1} - 1\right)A$ | $(wd - w)D$ $(d - 1)A$ | $(wd - w + 1)D$ $dA$ |
| Total Cost | $(wd - w + 1)D$ $\left(2^{w-2} + \frac{wd+1}{w+1} - 2\right)A$ | $(2^{w-2} + wd - w + 1)D$ $(2^{w-2} + d - 2)A$ | $(wd - w + 2)D$ $(2^{w-1} + d - 1)A$ |

APPLICATION EXAMPLES

The methods 800-1200 can be used in many ECC applications. They are particularly efficient if pre-computation can be computed in advance or by somebody else, which is the case in many applications. This section describes a couple of such application scenarios. One example is a system wherein a smart card is used to provide a tamper-resistant and secure environment to store secrets and execute critical cryptographic operations, while a separate, more powerful computing subsystem, is responsible for other operations. Cellular phones and wireless application protocol (WAP) devices are typical examples of such a system. In a cellular phone, the Subscriber Identification Module (SIM) card is a smart card to store securely critical subscriber's information and authentication and encryption methods responsible for providing legitimate access to the wireless network. The phone's CPU, memory, and storage are responsible for other operations. A Wireless Identity Module (WIM) card plays a similar role in a WAP device. In such a system, it may be possible to delegate the pre-computation to the more powerful device's CPU while using the smart card to execute the evaluation stage, if the computed points by the device's CPU are observable but not tamperable. Note that pre-computation does not contain any secrets unless the point itself is a secret.

The Elliptic Curve Digital Signature Algorithm (ECDSA) is another example. ECDSA is the elliptic curve analogue of the Digital Signature Algorithm (DSA) specified in a U.S. government standard called the Digital Signature Standard. ECDSA has been accepted in many standards. It includes signature generation and verification. Let P be a publicly known elliptic curve point and $\rho$ be the prime order of the point P. A signature is generated and verified in the following way: ECDSA Signature Generation: To sign a message m, an entity Å associated with a key pair (d, Q) executes the following steps:

1. Select a random or pseudorandom integer k, such that $1 \leq k < \rho$.
2. Compute $kP=(x_1, y_1)$ and $r=x_1 \bmod \rho$. If $r=0$, go to Step 1.
3. Compute $k^{-1} \bmod \rho$.
4. Compute $e=\text{SHA-1}(m)$, where SHA-1 is a Secure Hash Algorithm (SHA) specified in the Secure Hash Standard.
5. Compute $s=k^{-1}(e+dr) \bmod \rho$. If $s=0$, go to Step 1.
6. The signature generated by A for the message m is (r, s).

ECDSA Signature Verification: To verify A's signature (r, s) on a message m, an entity B obtains A's public key Q and executes the following steps:

1. Verify that r and s are integers in the interval $[1, \rho-1]$.
2. Compute $e=\text{SHA-1}(m)$.
3. Compute $w=s^{-1} \bmod \rho$.
4. Compute $u_1=ew \bmod \rho$ and $u_2=rw \bmod \rho$.
5. Compute $X=u_1P+u_2Q=(x_1, y_1)$. If $X=O$, reject the signature. Otherwise, compute $v=x_1 \bmod \rho$.
6. Accept the signature if and only if $v=r$.

For an ECDSA signature, P, $\rho$ and r, s, e are public values. The scalar k has to be kept secret. Otherwise the private key d can be derived from the equation $s=k^{-1}(e+dr) \bmod \rho$. Therefore, the private key d and the ECDSA signature generation must be securely stored and executed. This can be conveniently achieved with a smart card, which stores P's pre-computed points and uses a point multiplication method resistant to power analysis to calculate kP. The herein disclosed SPA-resistant comb methods are ideal for this application, since only the evaluation stage is executed in generating a signature. ECDSA signature verification, on the other hand, does not use any secret key. In verifying an ECDSA signature, the herein disclosed SPA-nonresistant comb methods can be used to compute $u_1P$ and the signed m-ary window method is used to compute $u_2Q$. This is an efficient combination of point multiplication methods since P's pre-computation points can be calculated in advance, and a comb method is more efficient than other methods in this case. As a contrast, Q's pre-computation points cannot be calculated in advance since the public key Q varies from one entity to another. The signed m-ary window method is appropriate in this case.

Exemplary Methods

FIG. 13 illustrates an example implementation 1300 showing operation of a recoding system, which could be adapted for use in elliptic curve point multiplication of an elliptic curve cryptosystem. The implementation 1300 is configured for use in many different computing environments, such as a smart card, cellular telephone, workstation or mainframe computing environment. At block 1302, an odd integer k is converted into a binary representation. The binary representation can be, for example, coefficients of powers of two. The conversion of block 1302 may be performed in a number of ways, such as the exemplary conversion discussed at blocks 1304-1308. At block 1304, each bit of a least significant d bits of the binary representation of the odd integer k are converted. The conversion is performed in a manner consistent with having a least significant bit in each bit-column that is either a 1 or a $\bar{1}$. Notice that this conversion could be performed in the manner disclosed at blocks 704-708 in FIG. 7. At block 1306, bits of the binary representation having significance greater than d are converted, such that a resulting bit at an $i^{th}$ position is either a 0 or a signed 1, wherein the signed 1 is signed according to a bit at an $(i \bmod d)^{th}$ position. The conversion of block 1306 can be performed in a variety of different manners, such as that shown in blocks 712-718 of FIG. 7 or at bock 1308. At block 1308, a sign of a current bit is compared to a sign of a least significant bit in a same comb bit-column. Where the signs are different and the current bit is a 1, the current bit is set to $\bar{1}$ and a value of a next higher significant bit is incremented by 1 to maintain k's value. At block 1310, the binary representation is configured as comb bit-columns, wherein every bit-columns is a signed odd integer. More specifically, the implementation 1300 could generate $K'^0_i \in \{1, \bar{1}\}$ and $K'^j_i \in \{0, K'^0_i\}$, $j \neq 0$ for each comb bit-column $\mathbb{K}'_i = [K'^{w-1}_i, \ldots, K'^1_i, K'^0_i]$, where $\bar{1}$ is defined as $-1$.

Figure 14:
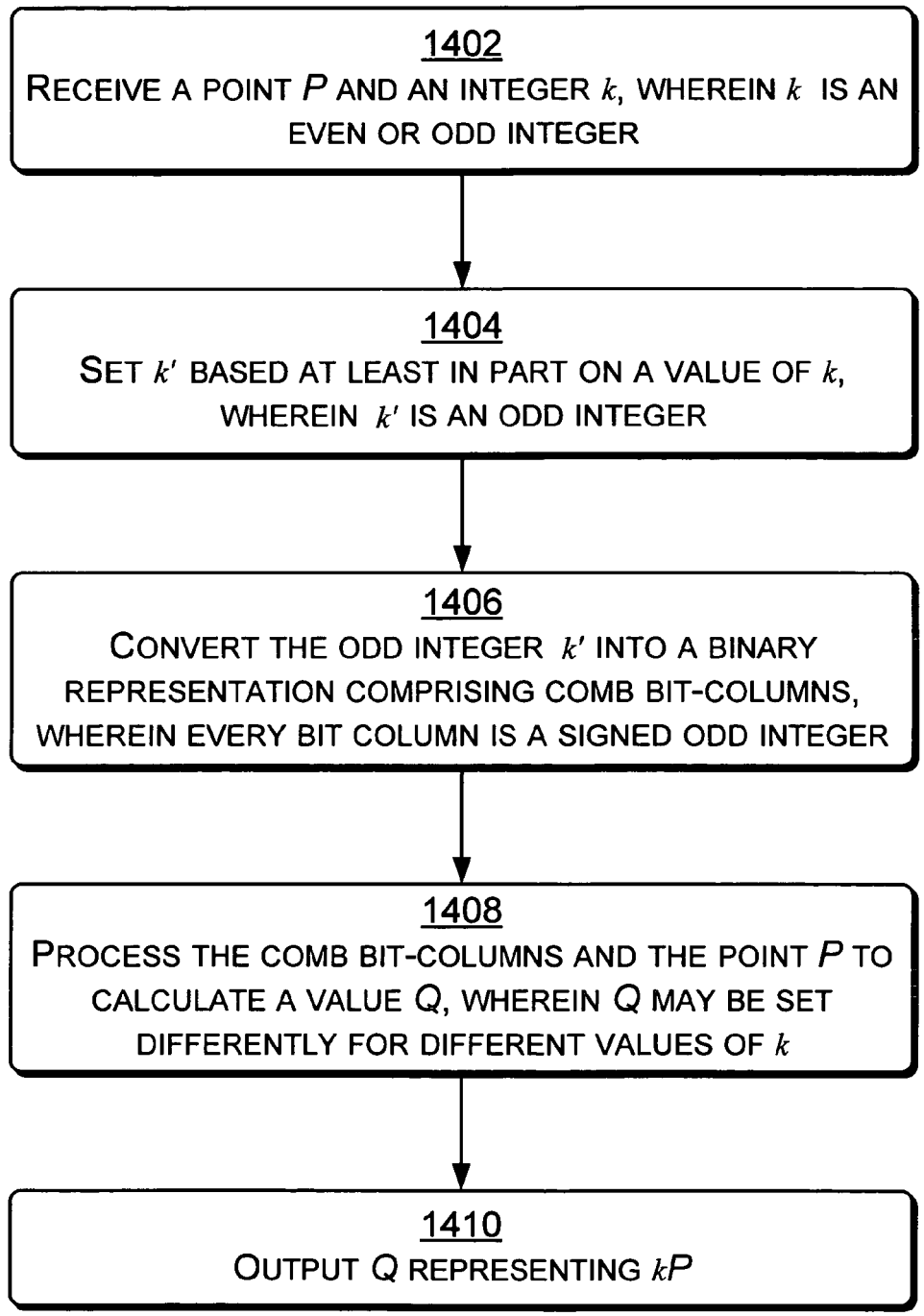
FIG. 14 illustrates an example embodiment of operation of a comb elliptic curve point multiplication system.

FIG. 14 illustrates an example of operation 1400 of an elliptic curve point multiplication system. At block 1402, a point P and an integer k are received, wherein k is an even or odd integer. At block 1404, k' is set based at least in part on a value of k, wherein k' is an odd integer. For example, at block 806 of FIG. 8, k' is set based on k's status as even or odd. At block 1406, the odd integer k' is converted into a binary representation comprising bit-columns, wherein every bit-column is a signed odd integer. For example, this could be performed according to the method 700 of FIG. 7. Accordingly, the operation 1406 may produce $K'^0_i \in \{1, \bar{1}\}$ and $K'^j_i \in \{0, K'^0_i\}$, $j \neq 0$ for each comb bit-column $\mathbb{K}'_i = [K'^{w-1}_i, \ldots, K'^1_i, K'^0_i]$, where $\bar{1}$ could be defined as $-1$. At block 1408, the comb bit-columns and the point P are processed to calculate a value Q, wherein Q may be set differently for different values of k. For example, blocks 818, 916, 1018, 1022-1024, 1120 and 1222-1224 all set Q based in part on k. At block 1410, Q is output, wherein Q represents kP.

Any of the methods described herein may be performed on a smart card, computer system or any digital processing device and/or component. For example, the methods may be performed by execution of instructions defined on a processor- and/or computer-readable medium. A "processor-readable medium," as used herein, can be any means that can contain or store instructions for use by or execution by a processor, whether on a smart card, computer or any computing or calculating device and/or component. A processor-readable medium can be, without limitation, an electronic, magnetic, optical, electromagnetic, infrared, or semiconductor system, apparatus, device, or component. More specific examples of a processor-readable medium include, among others, memory components on a smart card, a portable computer diskette, a random access memory (RAM), a read-only memory (ROM), an erasable programmable-read-only memory (EPROM or Flash memory), optical and/or magnetic memory, a rewritable compact disc (CD-RW), and a portable compact disc read-only memory (CDROM).

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Exemplary Computing Environment

Figure 15:
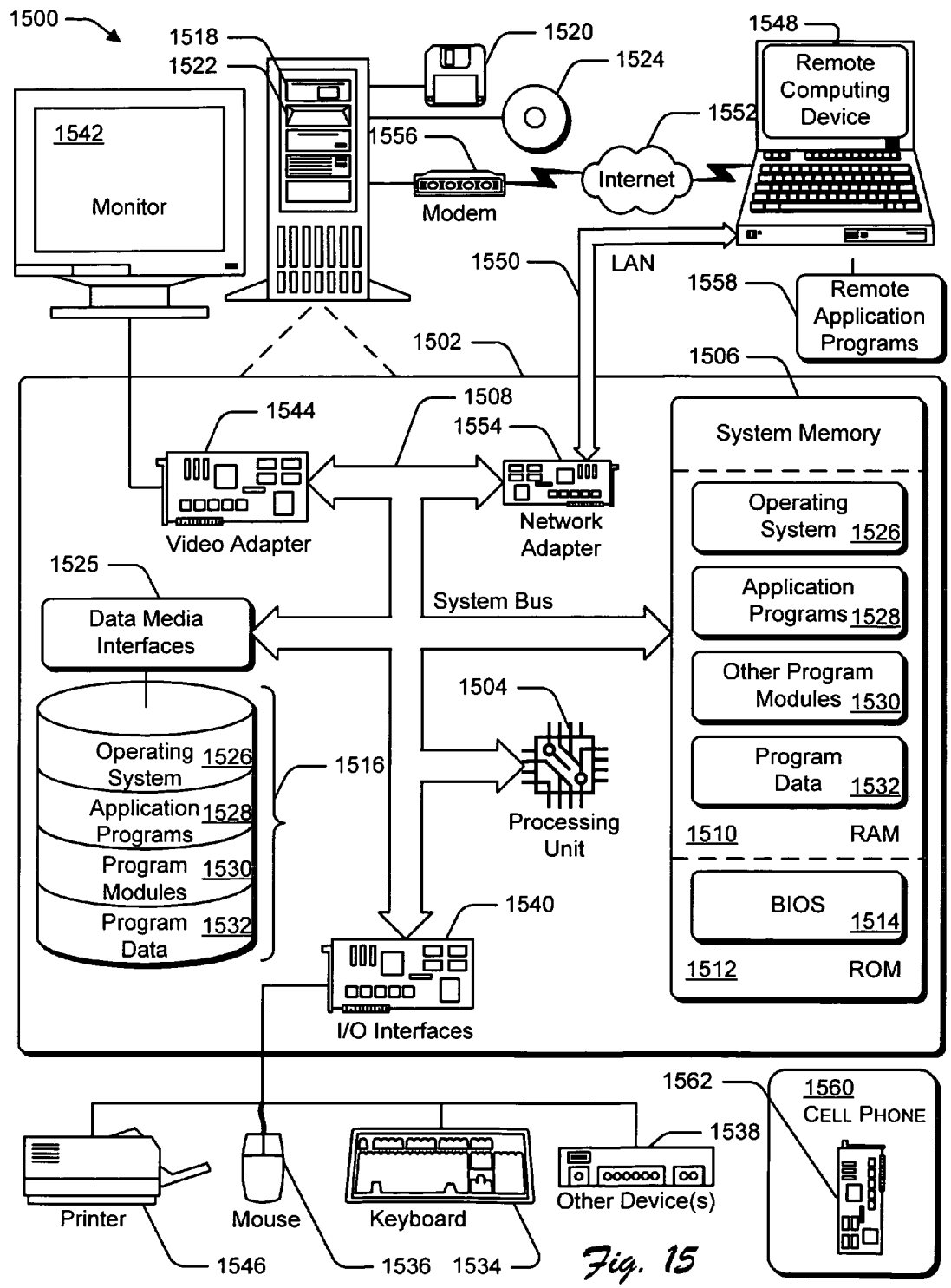
FIG. 15 illustrates an exemplary computing environment suitable for implementing a comb elliptic curve point multiplication method.

FIG. 15 illustrates an exemplary computing environment suitable for implementing an elliptic curve cryptosystem. Although one specific configuration is shown, any computing environment could be substituted to meet the needs of any particular application. The computing environment 1500 includes a general-purpose computing system in the form of a computer 1502. The components of computer 1502 can include, but are not limited to, one or more processors or processing units 1504, a system memory 1506, and a system bus 1508 that couples various system components including the processor 1504 to the system memory 1506. The system bus 1508 represents one or more of any of several types of bus structures, including a memory bus or memory controller, a peripheral bus, a Peripheral Component Interconnect (PCI) bus, an accelerated graphics port, and a processor or local bus using any of a variety of bus architectures.

Computer 1502 typically includes a variety of computer readable media. Such media can be any available media that is accessible by computer 1502 and includes both volatile and non-volatile media, removable and non-removable media. The system memory 1506 includes computer readable media in the form of volatile memory, such as random access memory (RAM) 1510, and/or non-volatile memory, such as read only memory (ROM) 1512. A basic input/output system (BIOS) 1514, containing the basic routines that help to transfer information between elements within computer 1502, such as during start-up, is stored in ROM 1512. RAM 1510 typically contains data and/or program modules that are immediately accessible to and/or presently operated on by the processing unit 1504.

Computer 1502 can also include other removable/non-removable, volatile/non-volatile computer storage media. By way of example, FIG. 15 illustrates a hard disk drive 1516 for reading from and writing to a non-removable, non-volatile magnetic media (not shown), a magnetic disk drive 1518 for reading from and writing to a removable, non-volatile magnetic disk 1520 (e.g., a "floppy disk"), and an optical disk drive 1522 for reading from and/or writing to a removable, non-volatile optical disk 1524 such as a CD-ROM, DVD-ROM, or other optical media. The hard disk drive 1516, magnetic disk drive 1518, and optical disk drive 1522 are each connected to the system bus 1508 by one or more data media interfaces 1525. Alternatively, the hard disk drive 1516, magnetic disk drive 1518, and optical disk drive 1522 can be connected to the system bus 1508 by a SCSI interface (not shown).

The disk drives and their associated computer-readable media provide non-volatile storage of computer readable instructions, data structures, program modules, and other data for computer 1502. Although the example illustrates a hard disk 1516, a removable magnetic disk 1520, and a removable optical disk 1524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1516, magnetic disk 1520, optical disk 1524, ROM 1512, and/or RAM 1510, including by way of example, an operating system 1526, one or more application programs 1528, other program modules 1530, and program data 1532. Each of such operating system 1526, one or more application programs 1528, other program modules 1530, and program data 1532 (or some combination thereof) may include an embodiment of a caching scheme for user network access information.

Computer 1502 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1502 via input devices such as a keyboard 1534 and a pointing device 1536 (e.g., a "mouse"). Other input and/or peripheral devices 1538 (not shown specifically) may include a smart card and/or smart card reader, microphone, joystick, game pad, satellite dish, serial port, scanner, and/or the like. These and other input devices are connected to the processing unit 1504 via input/output interfaces 1540 that are coupled to the system bus 1508, but may be connected by other interface and bus structures, such as a parallel port, game port, or a universal serial bus (USB).

A monitor 1542 or other type of display device can also be connected to the system bus 1508 via an interface, such as a video adapter 1544. In addition to the monitor 1542, other output peripheral devices can include components such as speakers (not shown) and a printer 1546 that can be connected to computer 1502 via the input/output interfaces 1540.

Computer 1502 can operate in a networked environment using logical connections to one or more remote computers, such as a remote computing device 1548. By way of example, the remote computing device 1548 can be a personal computer, portable computer, a server, a router, a network computer, a peer device or other common network node, and the like. The remote computing device 1548 is illustrated as a portable computer that can include many or all of the elements and features described herein relative to computer system 1502.

Logical connections between computer 1502 and the remote computer 1548 are depicted as a local area network (LAN) 1550 and a general wide area network (WAN) 1552. Such networking environments are commonplace in offices, enterprise-wide computer networks, intranets, and the Internet. When implemented in a LAN networking environment, the computer 1502 is connected to a local network 1550 via a network interface or adapter 1554. When implemented in a WAN networking environment, the computer 1502 typically includes a modem 1556 or other means for establishing communications over the wide network 1552. The modem 1556, which can be internal or external to computer 1502, can be connected to the system bus 1508 via the input/output interfaces 1540 or other appropriate mechanisms. It is to be appreciated that the illustrated network connections are exemplary and that other means of establishing communication link(s) between the computers 1502 and 1548 can be employed.

In a networked environment, such as that illustrated with computing environment 1500, program modules depicted relative to the computer 1502, or portions thereof, may be stored in a remote memory storage device. By way of example, remote application programs 1558 reside on a memory device of remote computer 1548. For purposes of illustration, application programs and other executable program components, such as the operating system, are illustrated herein as discrete blocks, although it is recognized that such programs and components reside at various times in different storage components of the computer system 1502, and are executed by the data processor(s) of the computer.

A cellular phone 1560 having an internal smart card 1562 provides a further environment wherein the comb methods 800-1400 could be utilized. The cellular phone may be configured to communicate with the computer 1502, which may be associated with a cellular telephone carrier or service. In such an environment, the ECC methods could be used, for example, to establish the authenticity of the cell phone 1560 as a legitimate customer of the cellular service provider, in this case operating the computer 1502.

CONCLUSION

A novel signed odd-only comb recoding method 700 of FIG. 7 converts comb bit-columns of the comb's sequence for an odd integer to a signed odd-only nonzero representation. Using this recoding method, several novel non-SPA-resistant and SPA-resistant comb methods 800-1200 of FIGS. 8-12 can be configured to calculate point multiplication for elliptic curve cryptosystems. The disclosed comb methods store fewer points and run faster than the known non-SPA-resistant and SPA-resistant comb methods. In addition, the disclosed signed odd-only comb methods inherit a comb method's advantage—running much faster than window methods and non-SPA-resistant signed m-ary window methods, when pre-computation points are calculated in advance or elsewhere. Accordingly, the signed odd-only comb methods 800-1200 of FIGS. 8-12 are well suited for use in smart cards and embedded systems where power and computing resources are at a premium. When combined with randomization techniques and certain precautions in selecting elliptic curves and parameters, the SPA-resistant comb methods can thwart all side-channel attacks.

In closing, although aspects of this disclosure include language specifically describing structural and/or methodological features of preferred embodiments, it is to be understood that the appended claims are not limited to the specific features or acts described. Rather, the specific features and acts are disclosed only as exemplary implementations, and are representative of more general concepts. Furthermore, a number of features were described herein by first identifying exemplary problems that these features can address. This manner of explication does not constitute an admission that others have appreciated and/or articulated the problems in the manner specified herein. Appreciation and articulation of the problems present in the relevant arts are to be understood as part of the present invention. More specifically, there is no admission herein that the features described in the Background section of this disclosure constitute prior art. Further, the subject matter set forth in the Summary section and the Abstract of this disclosure do not limit the subject matter set forth in the claims.

The invention claimed is:

1. A computer-implemented method, comprising:
    processing the computer implemented method on a processor of a computer;
    storing computer-executable instructions on a computer readable storage medium, that when executed by the processor, performs the computer implemented method, the method comprising:
    receiving a point P and an integer k; setting k' according to: when k is even set k'=k+1, otherwise set k'=k;
    converting the odd integer k' into a binary representation;
    configuring the binary representation as comb bit-columns, wherein each of the comb bit-columns is a signed odd integer wherein the configuring comprises:
        converting each bit of a least significant d bits of the binary representation of the odd integer k' to either a 1 or a −1; and
        converting bits of the binary representation having significance greater than d such that a resulting bit at an i-th position is either a 0 or a signed 1, wherein the signed 1 is signed according to a bit at an (i mod d)$^{th}$ position;
    setting a point Q to be a point at infinity;
    configuring a loop, within which Q is processed in operations using the converted binary representation and the point P; and
    outputting Q.

2. The computer-implemented method as recited in claim 1, wherein configuring comprises:
    configuring the binary representation according to $K'^0_i \in \{1, \overline{1}\}$ and $K'^j_i \in \{0, K'^0_i\}$, j≠0 for each comb bit column $K'_i \equiv [K'^{w-1}_i, \ldots, K'^1_i K'^0_i]$, wherein w is an integer such that w≧2.

3. The computer-implemented method as recited in claim 1, wherein converting each bit of the least significant d bits comprises:
    configuring a loop for index i running from the least significant bit towards higher significant bits, within which the least significant d bits are set according to:
    if $b_i$=1 then set $b'_i$=1; and
    if $b_i$=0 then set $b'_i$=1 and $b'_{i-1}=\overline{1}$.

4. The computer-implemented method as recited in claim 1, wherein converting bits of significance greater than d comprises:
    comparing a sign of a current bit to a sign of a least significant bit in a same comb bit-column; and
    where the signs are different and the current bit is 1, setting the current bit to $\overline{1}$ and incrementing by 1 a value of a next higher significance bit to maintain k's value.

5. The computer-implemented method as recited in claim 1, wherein converting bits of significance greater than d comprises:
    setting an initial value for e;
    configuring a loop, within which:
        if e is odd and $b'_{i \bmod d}=\overline{1}$, setting $b'_i=\overline{1}$ and
        $$e = \left\lfloor \frac{e}{2} \right\rfloor + 1;$$
    and
        otherwise, setting $b'_i$=e mod 2, and
        $$e = \left\lfloor \frac{e}{2} \right\rfloor.$$

6. The computer-implemented method as recited in claim 1, additionally comprising:
    within the loop within which Q is processed, inserting dummy operations to make the computer-implemented method resistant to SPA (Simple Power Analysis).

7. The computer-implemented method as recited in claim 1, additionally comprising:
    within the loop within which Q is processed, utilizing randomization techniques and selection of elliptic curves to provide resistant to DPA (Differential Power Analysis).

8. The computer-implemented method as recited in claim 1, additionally comprising:
    if the point P is of odd order ρ, then:
        setting k' as a function of ρ and k; and
        processing the bit-columns and the point P, wherein conditional steps in the processing are based on values for ρ and k, to calculate Q.

9. The computer-implemented method as recited in claim 8, additionally comprising:
    setting k* according to: if
    $$k > \frac{\rho}{2}$$
    then set k*=ρ−k, else set k*=k;
    setting k' according to: when k* is even set k'=k*+1, otherwise set k'=k*+2;
    setting Q to be a point at infinity;
    configuring a loop, within which Q is first doubled and then, depending on if k is larger than ρ/2 or not, a quantity of a comb bit-column times the point P is subtracted from, or added to, Q;
    calculating $P_2$=2P;
    setting Δ according to: if k is larger than ρ/2 set Δ=1, otherwise set Δ=−1; and adding to Q a value according to: if k* is even, adding ΔP to Q, otherwise adding $ΔP_2$ to Q.

10. A computing system, configured for recoding binary representations for use in elliptic curve point multiplication, the computing system comprising:
    a processor and a memory, within the computing system, wherein the processor executes instructions performing a method comprising:
    receiving an integer k and a point P;
    converting the integer k into a binary representation;

configuring the binary representation as comb bit-columns, wherein the configuring is performed on each bit of the least significant d bits of the binary representation by:
  configuring a loop for index i running from the least significant bit towards higher significant bits, within which the least significant d bits are set according to:
    if $b_i=1$ then set $b'_i=1$; and
    if $b_i=0$ then set $b'_i=1$ and $b'_{i-1}=\bar{1}$ and
  converting bits of the binary representation having significance greater than d such that a resulting bit at an i-th position is either a 0 or a signed 1, wherein the signed 1 is signed according to a bit at an (i mod d)$^{th}$ position;
setting a point Q to be a point at infinity;
calculating within a loop, to iteratively set Q using the $b'_i$ values of the comb bit-columns and the point P; and outputting Q.

12. The computing system of claim 10, wherein converting bits of the binary representation having significance greater than d comprises:
  setting an initial value for e; and
  configuring a loop, within which:
    if e is odd and $b'_{i\ mod\ d}=\bar{1}$, setting $b'_i=\bar{1}$ and $$e = \left\lfloor \frac{e}{2} \right\rfloor + 1;$$

and otherwise, setting $b'_i=e\ mod\ 2$, and $$e = \left\lfloor \frac{e}{2} \right\rfloor.$$

11. The computing system of claim 10, wherein the converting comprises:
  configuring the binary representation according to $K'_i{}^0 \in \{1, \bar{1}\}$ and $K'_i{}^j \in \{0, K'_i{}^0\}, j \neq 0$ for each comb bit-column $K'_i \equiv [K'_i{}^{w-1}, \ldots, K'_i{}^1 K'_i{}^0]$, wherein w is an integer such that $w \geq 2$.

* * * * *

UNITED STATES PATENT AND TRADEMARK OFFICE
CERTIFICATE OF CORRECTION

PATENT NO.        : 7,602,907 B2
APPLICATION NO.   : 11/173251
DATED             : October 13, 2009
INVENTOR(S)       : Bin Zhu et al.

It is certified that error appears in the above-identified patent and that said Letters Patent is hereby corrected as shown below:

In column 2, line 62, delete "Ablelian" and insert -- Abelian --, therefor.

In column 28, line 34, in Claim 8, delete "ρ,then" and insert -- ρ, then --, therefor.

In column 28, line 52, in Claim 9, delete "ρ/2or" and insert -- ρ/2 or --, therefor.

In column 28, line 57, in Claim 9, delete "ρ/2set" and insert -- ρ/2 set --, therefor.

In column 28, line 59, in Claim 9, delete "ΔP₂to" and insert -- ΔP₂ to --, therefor.

In column 29, line 9, in Claim 10, after " T " insert -- ; --.

In column 29, line 22, in Claim 11, delete " $K'^{ij}_i \epsilon \{0, K'^{0}_i\}, j \neq 0$ " and insert -- $K'^{ij}_i \in \{0, K'^{i0}_i\}, j \neq 0$ --, therefor.

Signed and Sealed this
Fifteenth Day of February, 2011

David J. Kappos
*Director of the United States Patent and Trademark Office*